United States Patent
Herring

(10) Patent No.: US 10,451,731 B2
(45) Date of Patent: Oct. 22, 2019

(54) SOFTWARE-DEFINED RADIO EARTH ATMOSPHERE IMAGER

(71) Applicant: Rodney Herring, Victoria (CA)

(72) Inventor: Rodney Herring, Victoria (CA)

(*) Notice: Subject to any disclaimer, the term of this patent is extended or adjusted under 35 U.S.C. 154(b) by 0 days.

(21) Appl. No.: 16/219,729

(22) Filed: Dec. 13, 2018

(65) Prior Publication Data

US 2019/0120957 A1    Apr. 25, 2019

Related U.S. Application Data

(63) Continuation-in-part of application No. PCT/CA2017/000153, filed on Jun. 14, 2017.

(60) Provisional application No. 62/349,756, filed on Jun. 14, 2016.

(51) Int. Cl.
| | | |
|---|---|---|
| *G01S 13/95* | (2006.01) | |
| *G01S 13/89* | (2006.01) | |
| *G01S 13/00* | (2006.01) | |
| *G01S 13/46* | (2006.01) | |
| *G01S 19/07* | (2010.01) | |

(52) U.S. Cl.
CPC .......... *G01S 13/951* (2013.01); *G01S 13/003* (2013.01); *G01S 13/46* (2013.01); *G01S 13/89* (2013.01); *G01S 19/07* (2013.01); *G01S 2013/468* (2013.01)

(58) Field of Classification Search
CPC ........ G01S 13/003; G01S 13/46; G01S 13/89; G01S 13/95; G01S 13/951; G01S 19/07
USPC ........................................................ 342/451
See application file for complete search history.

(56) References Cited

U.S. PATENT DOCUMENTS

| | | | | |
|---|---|---|---|---|
| 4,423,419 A | * | 12/1983 | Johannessen | G01S 1/24 342/378 |
| 4,665,404 A | * | 5/1987 | Christy | G01S 11/08 342/421 |
| 5,943,629 A | | 8/1999 | Ballard et al. | |

(Continued)

OTHER PUBLICATIONS

Canadian International Searching Authority, International Search Report dated Sep. 11, 2017, International Patent Application No. PCT/CA2017/000153, 3 Pages.

(Continued)

*Primary Examiner* — Dao L Phan
(74) *Attorney, Agent, or Firm* — Baumgartner Patent Law; Marc Baumgartner

(57) ABSTRACT

A Software Defined Radio Earth Atmosphere Imaging system comprising at least one imager, which comprises: a radio wave emitter configured to emit a sky wave, a ground wave and a first time signal; a radio wave detector, the radio wave detector including a two dimensional array of radio wave receivers, the radio wave detector for receiving a carrier wave and the ground wave and transmitting a second time signal; a vector network analyzer including a Global Navigation Satellite System and at least one synchronization clock, the vector network analyzer in electrical communication with the radio emitter via a first wire and with the radio wave detector via a second wire, the wires for transmitting the time signals; a software defined radio in electronic communication with the vector network analyzer; and a computing device, the computing device in electronic communication with the vector network analyzer.

18 Claims, 19 Drawing Sheets

(56) References Cited

U.S. PATENT DOCUMENTS

2019/0033465 A1* 1/2019 Kido ..................... G01S 19/07

OTHER PUBLICATIONS

Canadian International Searching Authority, Written Opinion of the International Searching Authority dated Sep. 11, 2017, International Patent Application No. PCT/CA2017/000153, 3 Pages.
Rishbeth et al., "F-region links with the lower atmosphere?" J. Atmosphere and Solar-Terrestrial Physics, vol. 68, Issue 3-5 (2006) 469-478.
The ARRL Antenna Book, Radio Wave Propagation, The American Radio Relay League (1991) 23-1.
Wikipedia definition of "Ionosonde", retrieved at https://en.wikipedia.org/wiki/Ionosonde on Dec. 11, 2018.
Herring et al., "Software radio measurements of Earth atmosphere's refractive indices," Proceedings of 2011 IEEE Pacific Rim Conference on Communications, Computers and Signal Processing, Victoria, BC, 2011, pp. 815-817.
Linty et al., "Benefits of GNSS software receivers for ionospheric monitoring at high latitudes," 2015 1st URSI Atlantic Radio Science Conference(URSI AT-RASC), Las Palmas, 2015, pp. 1-6.

* cited by examiner

SOFTWARE-DEFINED RADIO EARTH ATMOSPHERE IMAGER

CROSS REFERENCE TO RELATED APPLICATIONS

The present invention is a Continuation-in-Part application of International Application No. PCT/CA2017/000153, filed Jun. 14, 2017, which designated the U.S. and claims the benefit of priority to U.S. Provisional Application Ser. No. 62/349,756, filed on Jun. 14, 2016, and entitled SOFTWARE-DEFINED RADIO EARTH ATMOSPHERE IMAGER, each of which is hereby incorporated in its entirety including all tables, figures, and claims.

FIELD

The present technology and its associated imaging method relate to a Software-Defined Radio (SDR) Earth Atmosphere Imager. The SDR Earth Atmosphere Imager measures the properties of the Earth's atmosphere such as its power, energy, direction of movement, location of atmospheric disturbances and the Earth's refractive index from the ground to the upper atmosphere providing a measurement of the temperatures, pressures and compositions of the atmosphere by using radio wave measurements of the amplitudes, frequencies and wave vectors of the waves existing on the surface of the Earth's ionization layer, the ionosphere. Applications of the SDR Earth Imager include monitoring the Earth's atmosphere affected by atmospheric disturbing events due to solar, geomagnetic and meteorological events, helping to predict local to global daily weather and helping to measure and monitor climate change.

BACKGROUND

The Earth's atmosphere has several ionization layers known as the D layer, E layer and F1 and F2 layers created by the sun and solar radiation producing ions and electrons that recombine slowly due to the low air density in the upper region of the Earth's atmosphere (The ARRL Antenna Book, Radio Wave Propagation, The American Radio Relay League (1991) 23-1). The F2 layer that is around 100 km to 500 km from the surface of the Earth depending on the season of the year, the latitude, the time of day and the sun's brightness, is permanently stable, i.e., it is present throughout the entire 24 hour day. The D layer and E layer tend only to be present during solar radiation of the Earth's atmosphere, i.e., not at night.

For almost a century, the electromagnetic waves existing on the surface of Earth's ionization layers have been measured and recorded at a single point, i.e., zero-dimensionally, from the Earth's surface producing ionosonde data (https://en.m.wikipedia.org/wiki/Ionosonde).

The detected surface waves on the ionization layer are created by atmospheric disturbances due to solar, geomagnetic and meteorological events such as the sun spot activities having ~11 year cycle, yearly rotation of the Earth around the sun, seasonal changes of the Earth and shorter frequency, large atmosphere disturbing events such as typhoons, volcanoes, earthquakes, etc. Most of the waves on the surface of the ionization layer are believed to be due to meteorological events (FIG. 2, H. Rishbeth, "F-region links with the lower atmosphere?" J. Atmosphere and Solar-Terrestrial Physics, Vol. 68, Issue 3-5 (2006) 469-478.). The surface waves appear to have many sources, to be moving and to have a wide range of frequencies and amplitudes.

The use of beams of radiation to obtain information about an object by detecting the amplitude or phase of the beam is well known for scientific purposes. The beam of radiation, sometimes known as a carrier wave, can carry the information of the object. For example, the phase information of a beam that passes through or reflects from an object can provide information on the object's temperature, pressure, composition, magnetic fields or electric fields, whereas amplitude measurements can provide information on the opaqueness or density of the object. The beams are comprised of waves of radiation, where a wave, $\Phi$, can be described as having both an amplitude, $A$, and phase, $\theta$, described mathematically as, $$\Phi = A \exp(\theta) \qquad 1)$$

The information obtained from the method depends on whether it is detecting the amplitude or both the amplitude and phase of a beam's wave. If the method measures only a beam's amplitude only density differences in the object are reported. This is a limitation of the technology as it does not provide information such as an object's temperature, pressure, composition, magnetic fields or electric fields. If the method measures the beam's phase, object information such as electromagnetic waves that exist on an object's surface can be revealed. If the method uses a detector comprising of a two-dimensional array of radio wave receivers or antennae, a two-dimensional phase image of the waves existing on the object's surface, i.e., the ionization layer's surface, can be revealed. From the phase shifts produced within the phase image, a measurement of the amplitudes, frequencies and directions (the so-called wave vectors) of the waves existing on the surface of the ionization layer is made possible.

Radio waves, typically from about 3 Mega Hertz (MHz) to about 7 MHz and as high as 10 MHz, when emitted from the surface of the Earth, referred to as sky waves, can reflect off the Earth's ionization layers and return back to Earth. The reflection of radio waves off the ionization layer is commonly used to extend the reach of radio waves for transmission and communication purposes (The ARRL Antenna Book, Radio Wave Propagation, The American Radio Relay League (1991) 23-1). Sky waves are also being used to produce ionosondes using one antenna. This method cannot be used to obtain phase information.

What is needed is a system that can accurately image waves on the lower surface of one or more layers the ionosphere in order to track atmospheric disturbances and conditions, including those caused by changes to the climate, fires, volcanoes, and the like. It would be advantageous if the location of the atmospheric condition or disturbance could be identified. It would be of further advantage if there was a method of obtaining accurate data about the surface waves of the ionosphere.

SUMMARY

The present technology is a system that can accurately image waves on the surface of each layer of the ionosphere in order to track atmospheric disturbances and conditions, including those caused by changes to the climate, fires, volcanoes, and the like. It can provide the location of the atmospheric condition or disturbance. A method of obtaining accurate data about the surface waves of the ionosphere is also provided.

In one embodiment a Software-Defined Radio (SDR) Earth Atmosphere Imaging system is provided for use with a computing device. The system comprises an at least one imager, the imager comprising: a radio wave emitter configured to emit a sky wave signal; a radio wave detector, the radio wave detector including either a one dimensional array of radio wave receivers or a two dimensional array of radio wave receivers, the radio wave detector configured to receive a carrier wave signal; a vector network analyzer, the vector network analyzer including a Global Navigation Satellite System (GNSS) and an at least one timer, the vector network analyzer in electrical communication with the radio wave emitter via a first wire and the radio wave detector via a second wire or the radio wave emitter is configured to emit a first reference wave to the vector network analyzer upon emitting the sky wave signal and the radio wave detector is configured to emit a second reference wave to the vector network analyzer upon receiving the carrier wave signal; and a software defined radio in electronic communication with the vector network analyzer.

In the system, the radio wave emitter and radio wave detector may communicate with the vector network analyzer via the first wire and the second wire, respectively.

In the system, the radio wave detector may be a two-dimensional array of radio wave receivers.

In the system, the vector network analyzer may include a quadrature processor.

In the system, wherein the imager may include a low pass filter.

The system may further comprise the computing device, the computing device in electronic communication with the vector network analyzer of the imagers.

In the system, the computing device may include a memory and a processor, the memory including instructions for calculating a phase shift.

In the system, the memory may further include instructions for calculating a refractive index based on the phase shift.

In the system, the radio wave emitter may be configured to emit a ground wave and the radio wave detector is configured to detect the ground wave.

In the system, there may be at least two imagers.

In the system, the radio wave emitter may be configured to emit a first reference wave to the vector network analyzer upon emitting the sky wave signal and the radio wave detector is configured to emit a second reference wave to the vector network analyzer upon receiving the carrier wave signal.

In another embodiment, a method of detecting an atmosphere disturbing event at a location is provided, the method comprising utilizing an imager, the imager comprising: a radio wave emitter configured to emit a sky wave signal; a radio wave detector, the radio wave detector including either a one dimensional array of radio wave receivers or a two dimensional array of radio wave receivers, the radio wave detector configured to receive a carrier wave signal; a vector network analyzer, the vector network analyzer including a GNSS and an at least one timer, the vector network analyzer in electrical communication with the radio wave emitter via a first wire and the radio wave detector via a second wire or the radio wave emitter is configured to emit a first reference wave to the vector network analyzer upon emitting the sky wave signal and the radio wave detector is configured to emit a second reference wave to the vector network analyzer upon receiving the carrier wave signal; and a software defined radio in electronic communication with the vector network analyzer, the method comprising emitting a radio wave from the radio emitter to the ionosphere, concomitantly sending a first time signal, detecting a carrier wave reflected from the ionosphere with a one or two dimensional array of radio wave receivers housed in the radio wave detector, concomitantly sending a second time signal, determining a time difference between the first time signal and the second time signal, determining a phase difference between the emitted radio wave and the carrier wave with the vector network analyzer, based on the time difference.

The method may further comprise locating the atmosphere disturbing event using triangulation between at least two imagers.

The method may further comprise analyzing a phase shift to quantify the atmosphere disturbing event.

The method may further comprise reporting on the location of the atmosphere disturbing event.

In another embodiment, a Software-Defined Radio (SDR) Earth Atmosphere Imaging system is provided, the system comprising an at least one imager, the imager comprising: a radio wave emitter configured to emit a sky wave signal and a ground wave signal; a radio wave detector, the radio wave detector including a two dimensional array of radio wave receivers, the radio wave detector configured to receive a carrier wave signal; a vector network analyzer including a GNSS and at least one synchronization clock, the vector network analyzer in electrical communication with the radio emitter via a first wire and with the radio wave detector via a second wire; a software defined radio in electronic communication with the vector network analyzer; and a computing device, the computing device in electronic communication with the vector network analyzer.

The system may comprise two or more imagers.

In the system, the vector network analyzer may further include a quadrature processor.

In yet another embodiment, a Software-Defined Radio (SDR) Earth Atmosphere Imaging system is provided for use with a computing device, the system comprising an at least one imager, the imager comprising: a radio wave emitter configured to emit a sky wave signal; a radio wave detector, the radio wave detector including either a one dimensional array of radio wave receivers or a two dimensional array of radio wave receivers, the radio wave detector configured to receive a carrier wave signal; a vector network analyzer, the vector network analyzer including a GNSS and a quadrature processor, the vector network analyzer in electrical communication with the radio wave emitter via a first wire and the radio wave detector via a second wire; and a software defined radio in electronic communication with the vector network analyzer.

In yet another embodiment, a method of detecting an atmosphere disturbing event at a location, is provided, the method comprising utilizing the imaging system described immediately above.

FIGURES

Figure 14A:
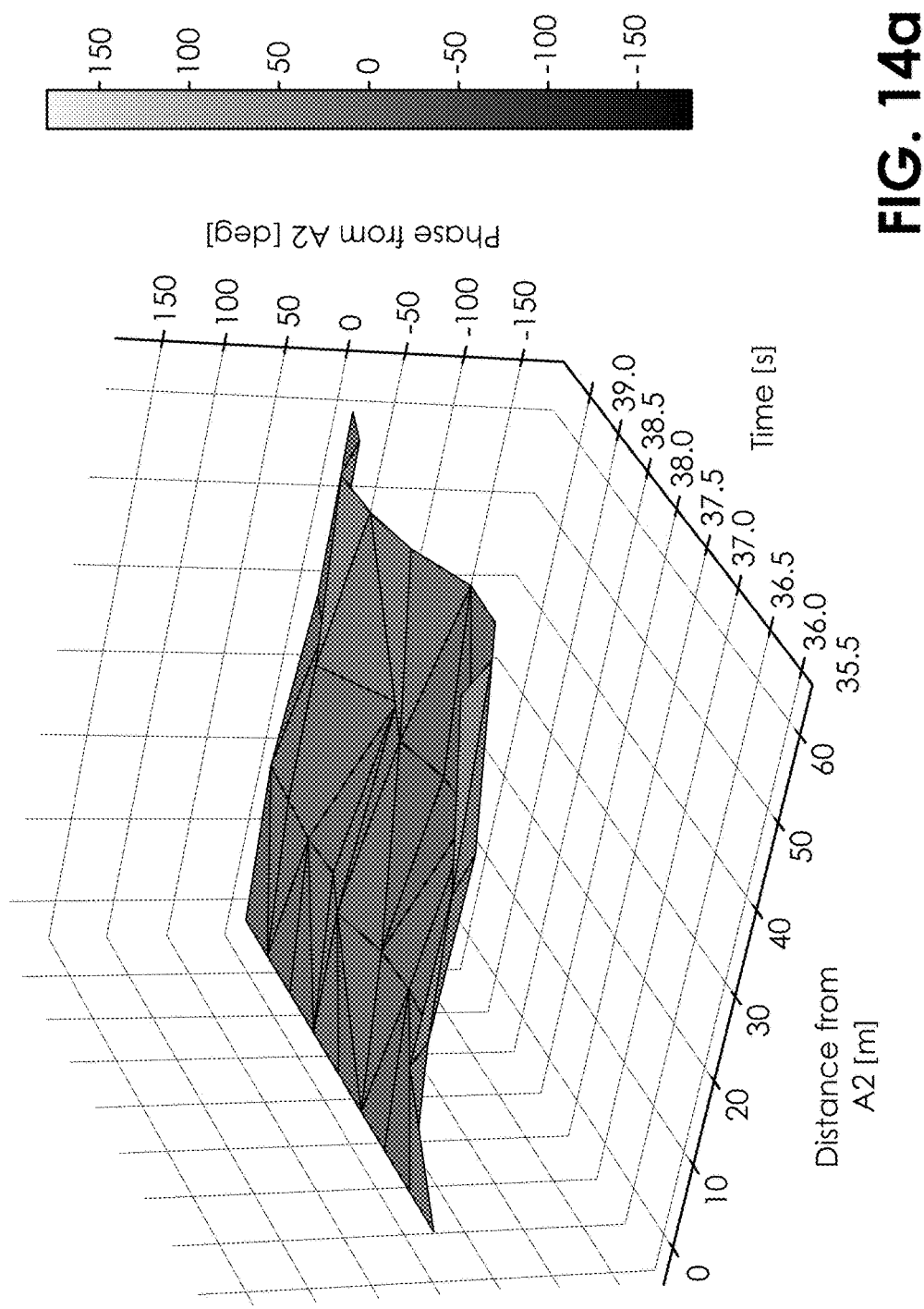
Figure 14B:
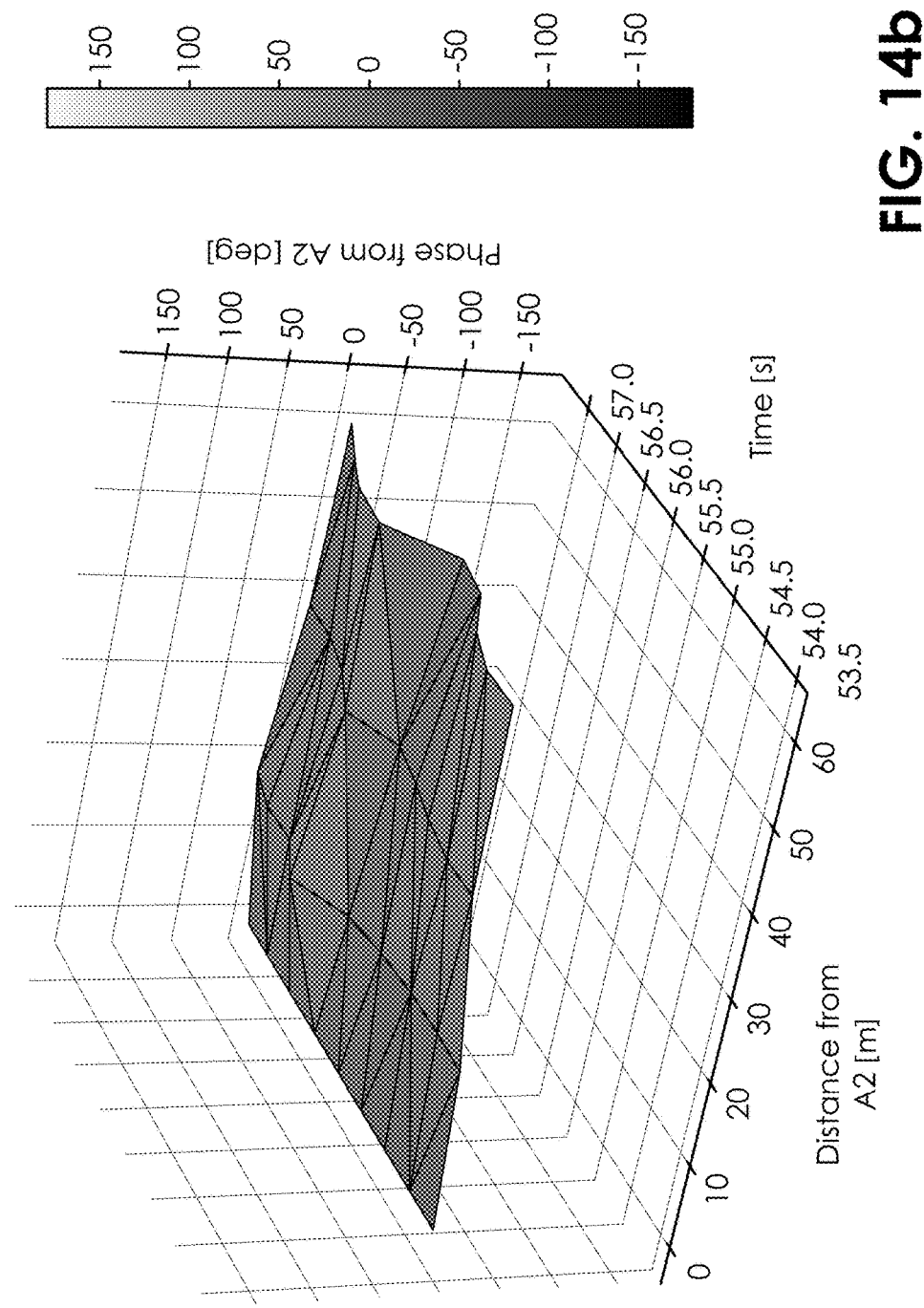
Figure 14C:
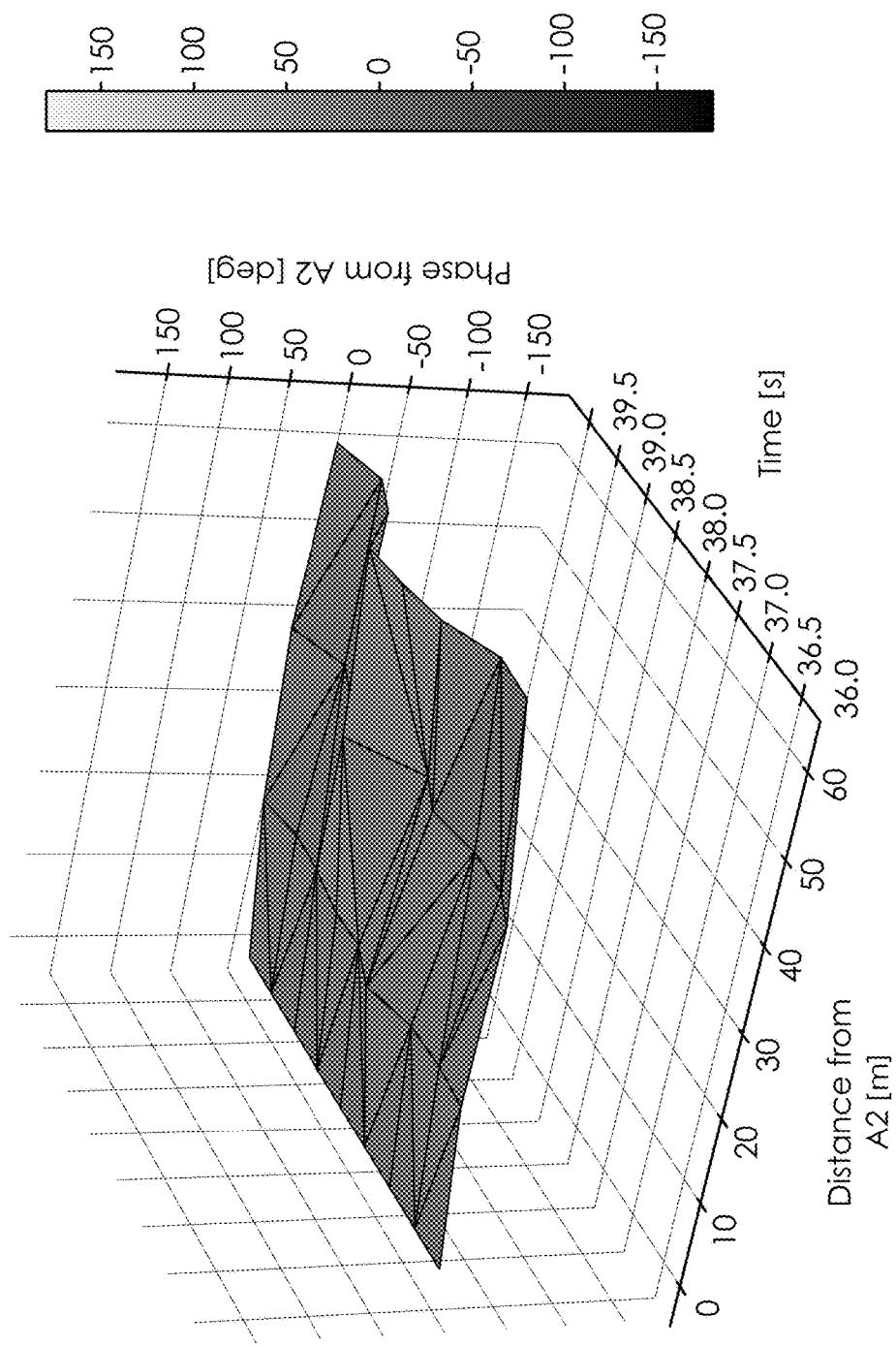

FIGS. 14a-c are examples of images of the waves moving in Earth's F ionization layer collected in July, 2018 at Dominion Radio Astrophysical Observatory (DRAO) having a constant amplitude, frequency and direction of movement. FIG. 14a is at time one; FIG. 14b is at time two; and FIG. 14c is at time three.

Figure 15A:
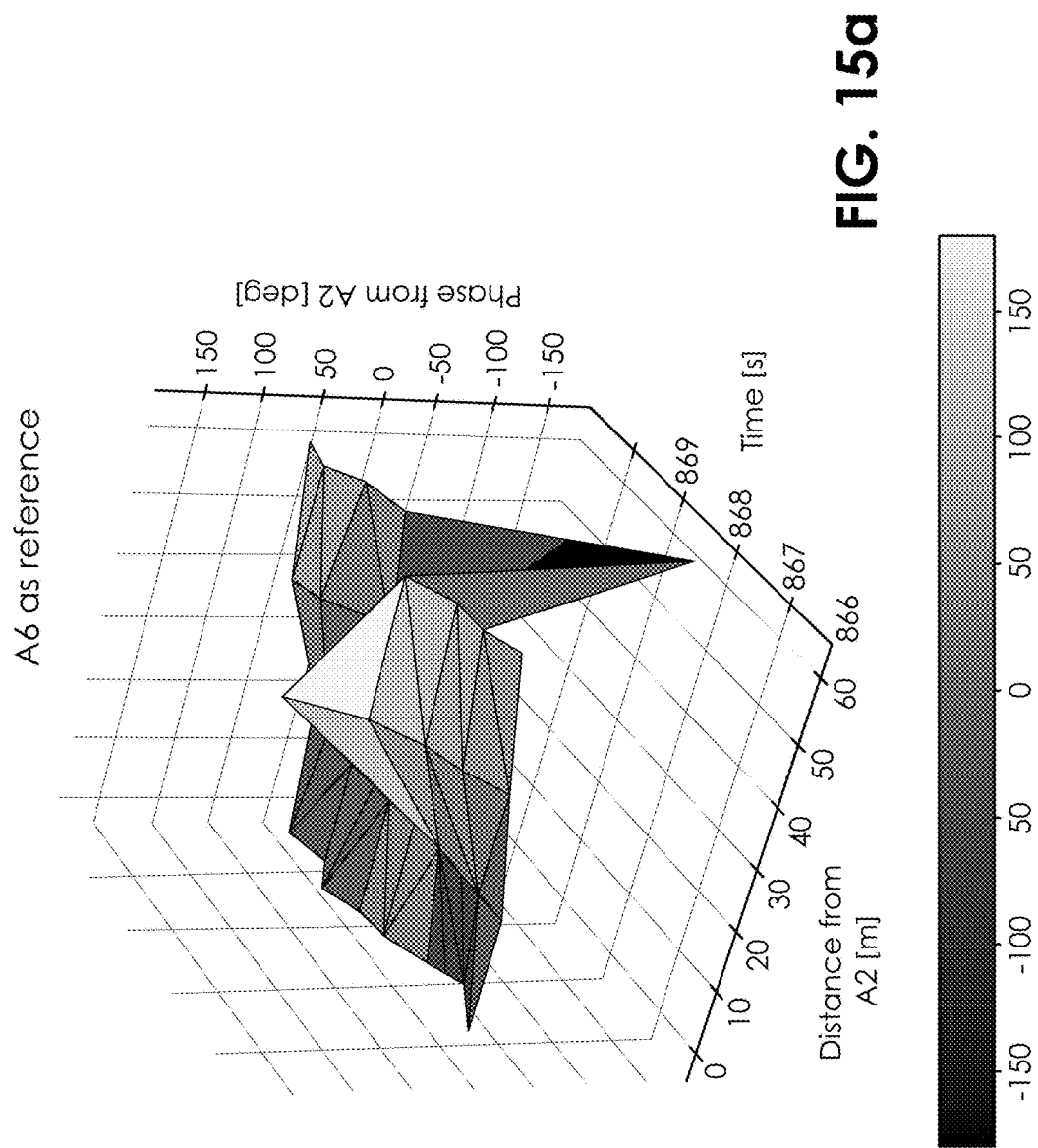
Figure 15B:
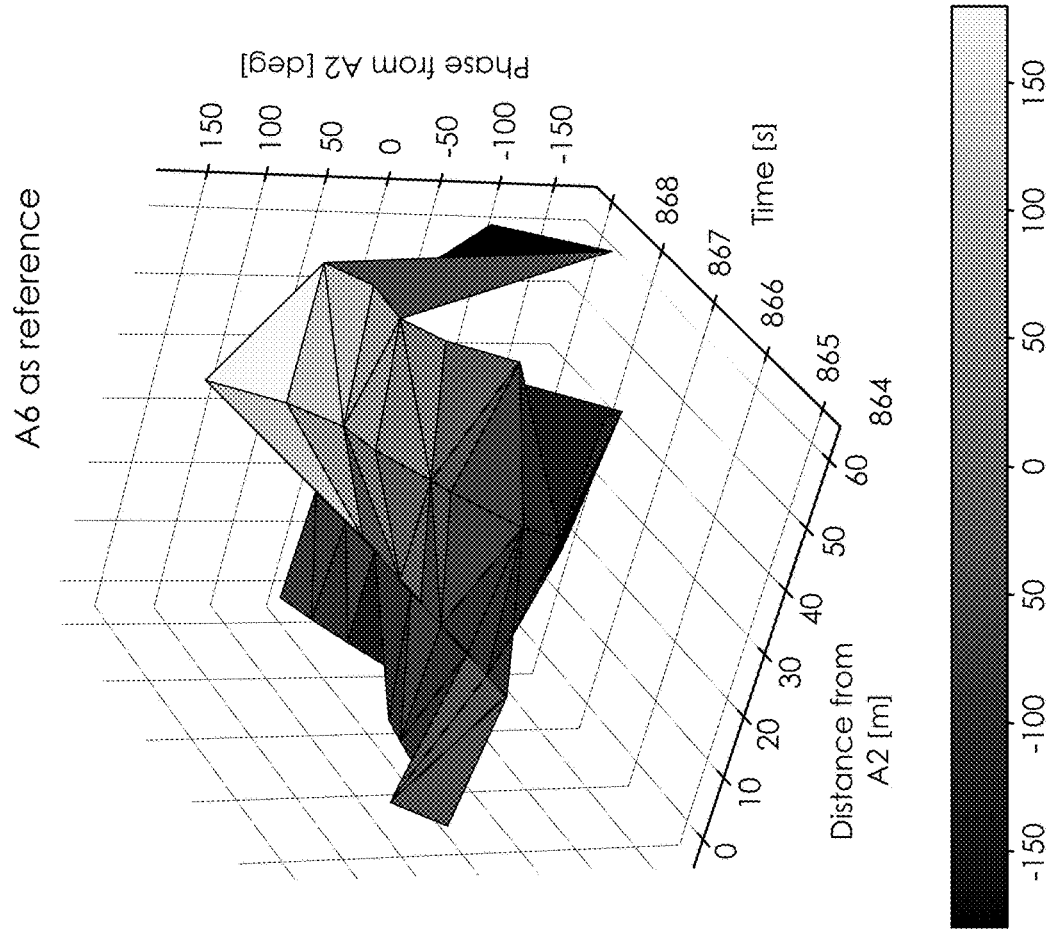
Figure 15C:
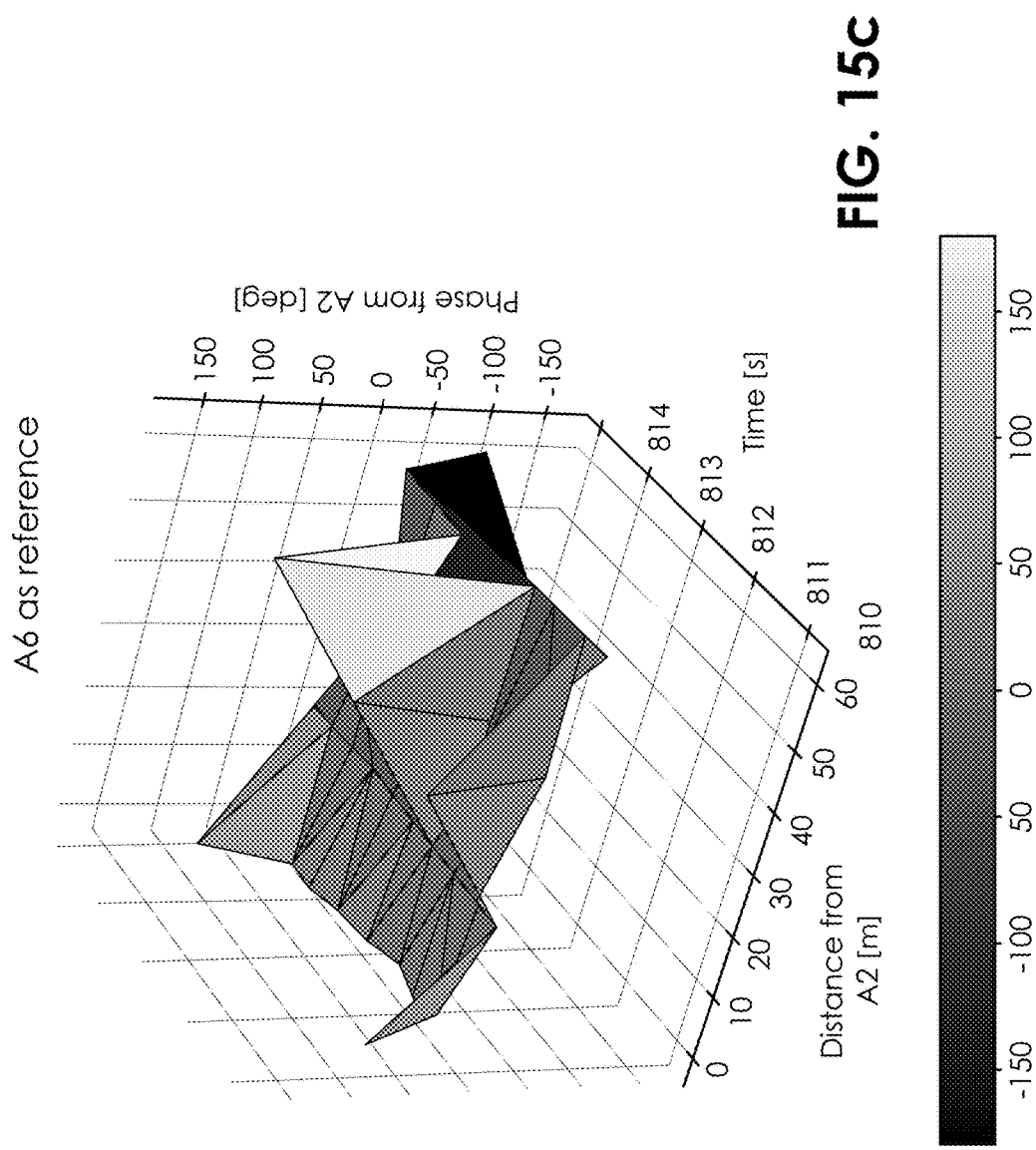

FIGS. 15a-c are examples of images of sporadic waves having a high amplitude spike moving in Earth's F ionization layer collected in July, 2018 at DRAO. FIG. 15a is at time one; FIG. 15b is at time two; and FIG. 15c is at time three.

DESCRIPTION

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted. To the extent necessary to provide descriptive support, the subject matter and/or text of the appended claims is incorporated herein by reference in their entirety.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

The SDR Earth Atmosphere Imager measures the amplitudes (intensity) and phases (frequencies and wave vectors) of the waves existing on the surface of the Earth's ionization layers that have been seen in ionograms (https://www.ngdc.noaa.gov/stp/iono/ionogram.html).

Each layer of the ionosphere has a different height from the Earth's surface. By using a different reflected radio wave frequency for the lower surface of each layer (the D layer, E layer and F [F1 and F2] layers), three independent equations are produced, which are the same as equation 4 below, but with different constants. These equations can be solved to provide temperature, pressure and composition information. Note that the lower surface of the lower layer (the D layer in the day and the E layer at night) is shown in the figures, by way of example. The lower surface of any layer can be measured.

The amplitude of the wave existing on the surface of an ionization layer represents the magnitude or power of the atmosphere disturbance that created the wave. The frequency of the wave represents the energy of the atmosphere disturbing event. The wave vector gives the direction of movement of the wave created by the atmosphere disturbing event. Measurement of two or more wave vectors by two or more separated SDR Earth Atmosphere Imagers can be used to determine the location of the Earth atmosphere disturbing event using stereographic projection.

Figure 1:
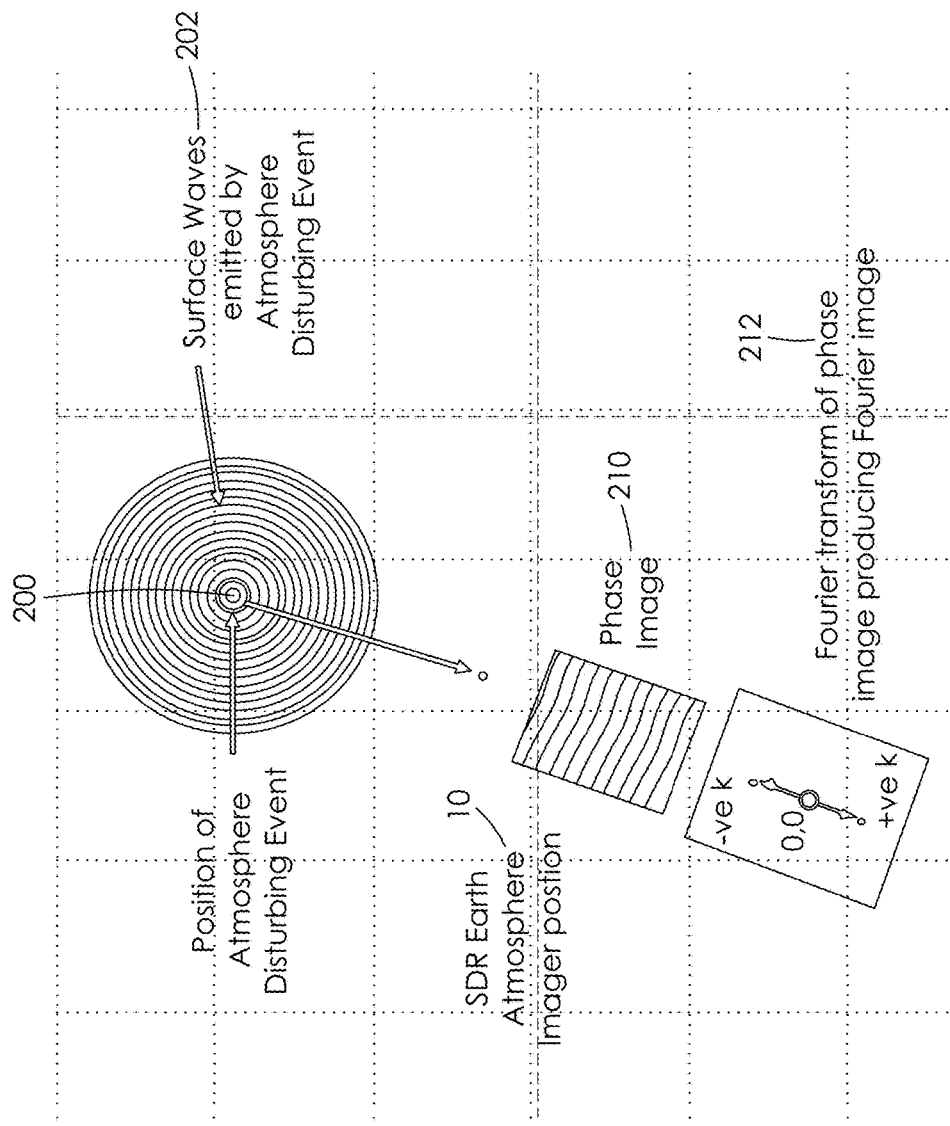
FIG. 1 shows a simulation of the phase image produced by the SDR Earth Atmosphere Image due to an Earth atmosphere disturbing event that is mathematically processed into a Fourier image, which shows two Fourier peaks and their wave vectors (arrowed +ve k and −ve k), representing the frequencies and wave vectors of the surface waves.

As shown in FIG. 1, an atmosphere disturbing event 200 produces surface waves 202 in an ionization layer. These surface waves could represent (caused by) an atmosphere disturbing event of the ionization layer. An atmosphere disturbing event could be a storm such as a hurricane, typhoon or tornado. It can also be used to measure the Earth's auroras at the north and south poles. The amplitude of the surface wave could represent the power of the atmosphere disturbing event. The frequency of the surface wave could represent the energy of this atmosphere disturbing event. The wave vector could represent the direction of travel of the atmosphere disturbing event.

Figure 2:
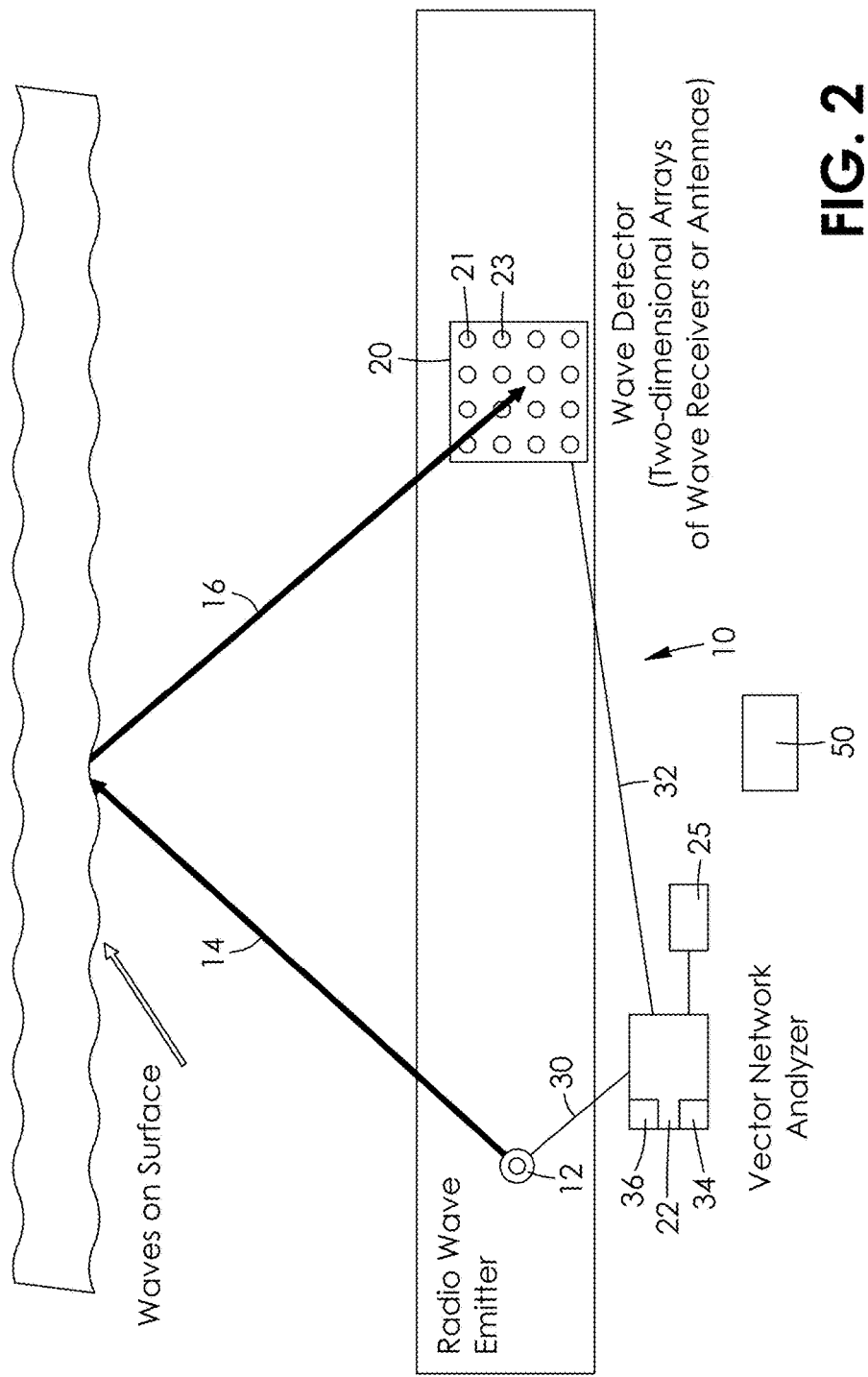
FIG. 2 is a Software Defined Radio Earth Atmosphere Imager of the present technology.

A Software-Defined Radio Earth Atmosphere Imager, generally referred to as 10 is shown in FIG. 2. A radio wave emitter 12 emits sky wave signals 14 that strike an ionization layer or ionosphere. The sky wave signals 14 are as low as about 0.3 MHz and more commonly about 1 MHz to about 10 MHz. The sky wave signals 14 are reflected back to earth as carrier wave signal 16. The carrier wave signal 16 are intercepted by a radio wave detector 20, which is more specifically a two dimensional array detector 20 with either a two dimensional array 23 of radio wave receivers or a two dimensional array of antennae. A vector network analyzer 22 is controlled by a software defined radio 25 (https://en.wikipedia.org/wiki/Software-defined_radioNmedia/File: SDR_et_WF.svg) (SDR). The SDR 25 obtains data from the vector network analyzer and controls its acquisition and data manipulation. The vector network analyzer is electrically connected to the radio wave emitter 12 and the detector 20 by a first wire 30 between the radio wave emitter 12 and the vector network analyzer 22 and to the detector 20 by a second wire 32 between the detector 20 and the vector network analyzer 22. The vector network analyzer 22 includes a GNSS (Global Positioning System) 34 with synchronizing clocks such as atomic clocks 36 having time resolution of ~10 exp(−11) s. The vector network analyzer 22 is preferably multiplexed with the detector 20 as every antenna of the detector needs to have a phase and amplitude measurement performed by the network vector analyzer. This can be done quickly serially but is best done by multiplexing.

In one embodiment, shown in FIG. 2, the vector network analyzer 22 is used to measure the amplitude and phase of the sky wave signal 14 as well as the amplitudes and phases of the carrier wave signal 16 at each receiver 21 or antennae. A signal from the radio wave emitter 12 is sent through the first wire 30 and indicates the time that a sky wave signal 14 is sent. A signal from the radio wave detector 20 is sent through the second wire and indicates when the carrier wave signal 16 arrives. Therefore, this provides a time reference for determining the time taken by the sky wave signal 14 to reach each receiver 21 of the detector 20.

Figure 3:
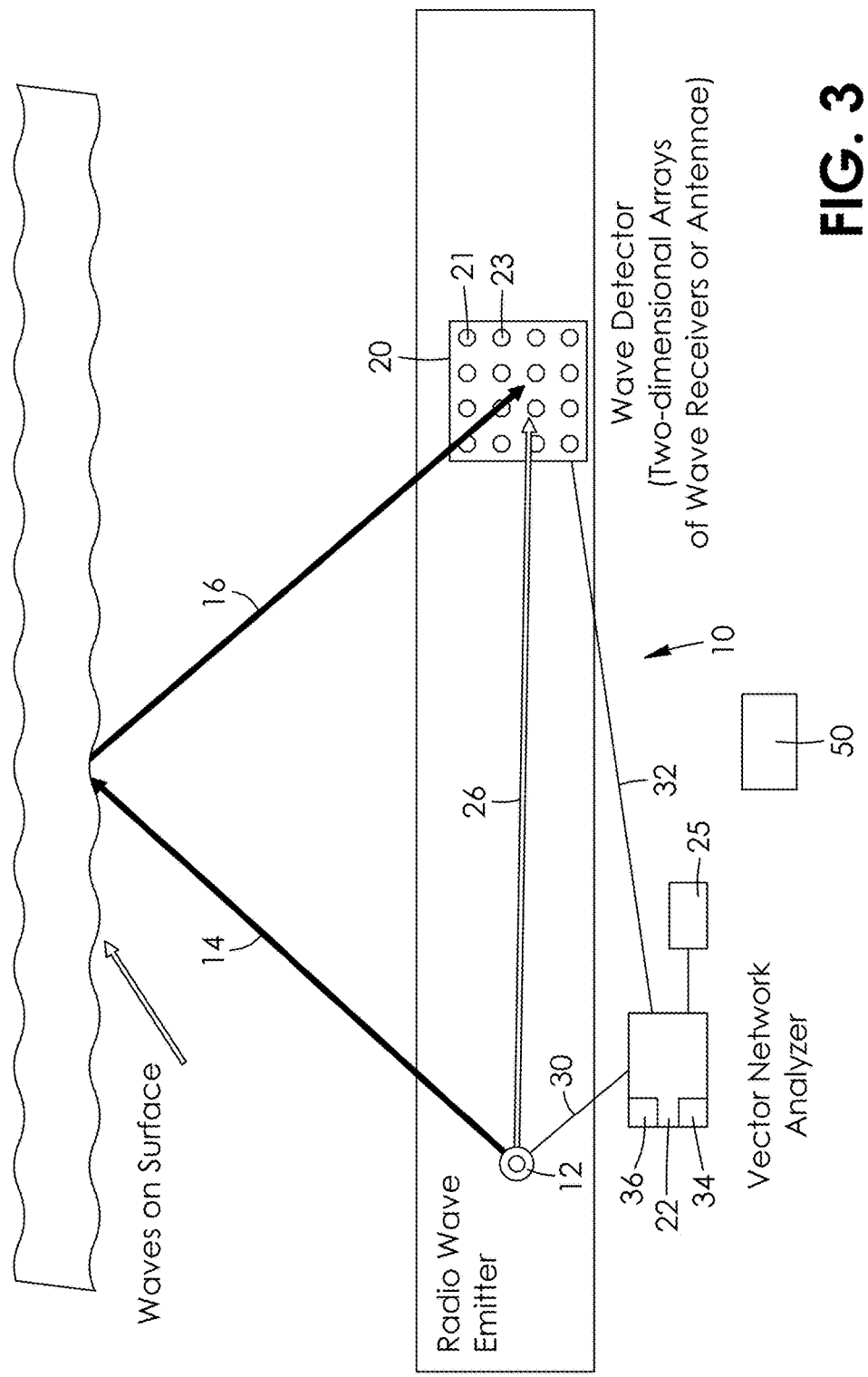
FIG. 3 is an alternative embodiment of the Software Defined Radio Earth Atmosphere Imager of FIG. 1.

In an alternative embodiment, shown in FIG. 3, the vector network analyzer 22 is used to measure the amplitude and phase of the sky wave signal 14 as well as the amplitudes and phases of the carrier wave signal 16 at each receiver 21 or antennae. The radio wave emitter 12 sends ground wave signals 26 and sky wave signals 14 to the detector 20, rather than using the first wire 30 and second wire 32 to determine the time reference. The ground wave signal 26, which is emitted simultaneously with the radio wave traveling through the sky, i.e., the sky wave signal 14, can be used to determine the time taken from the radio wave emitter 12 to the each receiver 21 of the detector 20. The ground wave signal 26 travels directly to the detector 20 whereas the sky wave signal 14 travels up to an ionization layer and then back down to the detector 20. Knowing the distance traveled by the ground wave signal 26 using GNSS 34 enables the ground wave signal 26 to be used as a time reference for determining the time taken by the sky wave signal 14 to reach each receiver 21 of the detector 20. The difference in time for the carrier wave signal 16 to reach each receiver 21 of the detector 20 is the phase shift or phase difference between each receiver. The phase shift measured by all the receivers 21 can be used by the computer 50 to make a phase image of the waves on the surface of an ionization layer.

Figure 4:
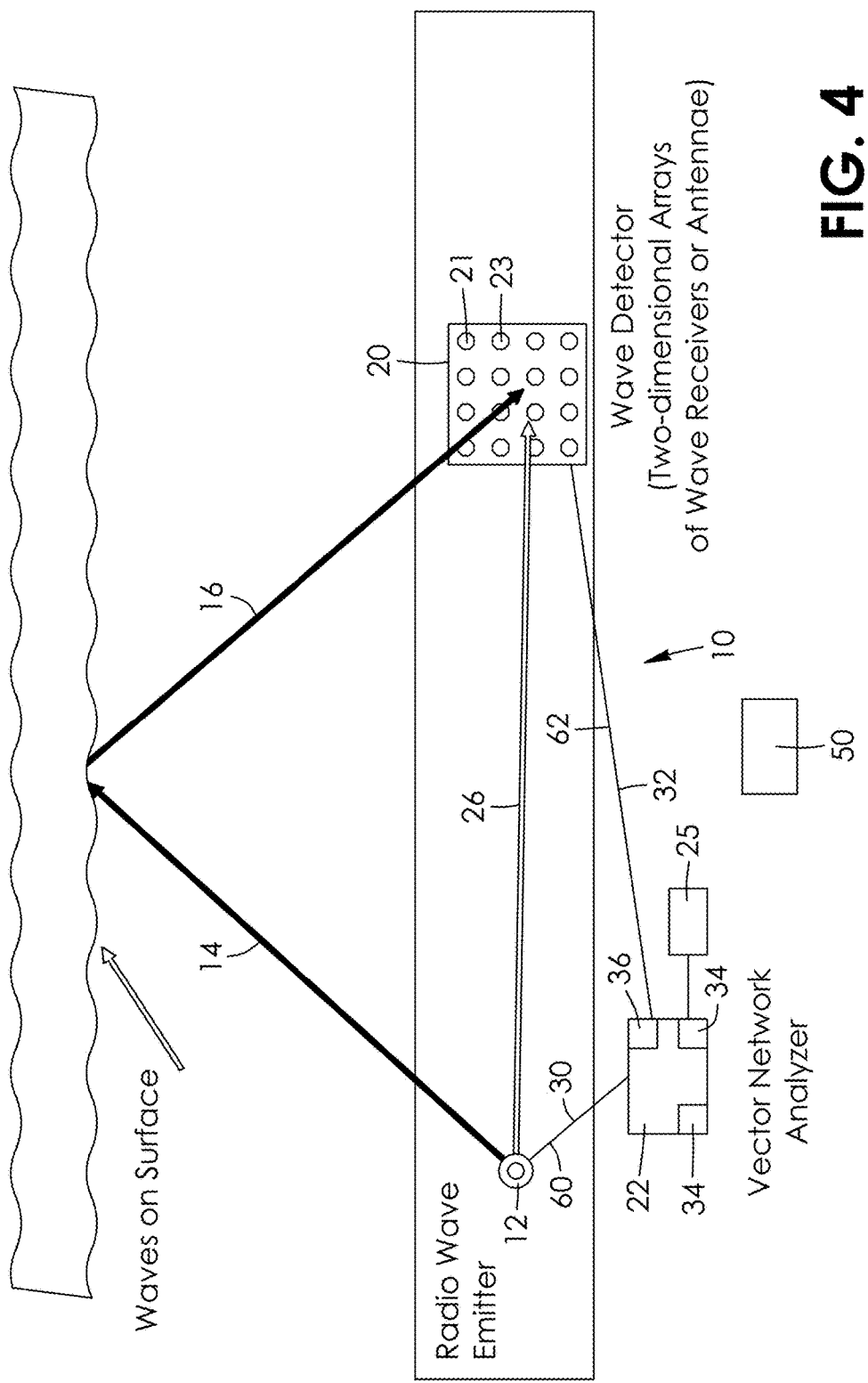
FIG. 4 is another embodiment of the Software Defined Radio Earth Atmosphere Imager of FIG. 1.

In yet another embodiment, shown in FIG. 4, the vector network analyzer 22 is used to measure the amplitude and phase of the sky wave signal 14 and ground wave signal 26 as well as the amplitudes and phases of the carrier wave signal 16 at each receiver or antennae. The vector network analyzer 22 includes a quadrature processor 38, which measures the angular rotation of the carrier wave signal 16 and sky wave signal 14. The difference in rotation is a measure of the phase shift. Again, the phase shift measured by all the receivers 21 can be used by the computer 50 to make a phase image of the waves on the surface of an ionization layer. The phase shift information is sent to a computing device 50 in electronic communication with the vector network analyzer 22. The computing device 50 records and analyzes the data to produce a phase image made from all of the measurements of the receivers 21 of the detector 20. The phase image contains information of the surface waves of an ionization layer. As described above, the vector network analyzer 22 includes the GNSS 34 and at least one timer 36. It is controlled by the software defined radio 25.

In yet another embodiment, also shown in FIG. 4, a combined approach is taken that includes both the quadrature method and the time method. The vector network analyzer 22 includes the GNSS 34 and at least one timer 36. The radio wave emitter 12 is configured to send a first reference electrical signal 60 containing emission time and quadrature phase information to the vector network analyzer 22 upon emitting the sky wave signal 14 and the radio wave detector 20 is configured to send a second electrical signal 62 containing the detection time and quadrature phase information to the vector network analyzer 22 upon receiving the carrier wave signal 16. The software defined radio 25 is electronic communication with the vector network analyzer 22 and controls it. The phase image contains information of the surface waves of an ionization layer.

Figure 5:
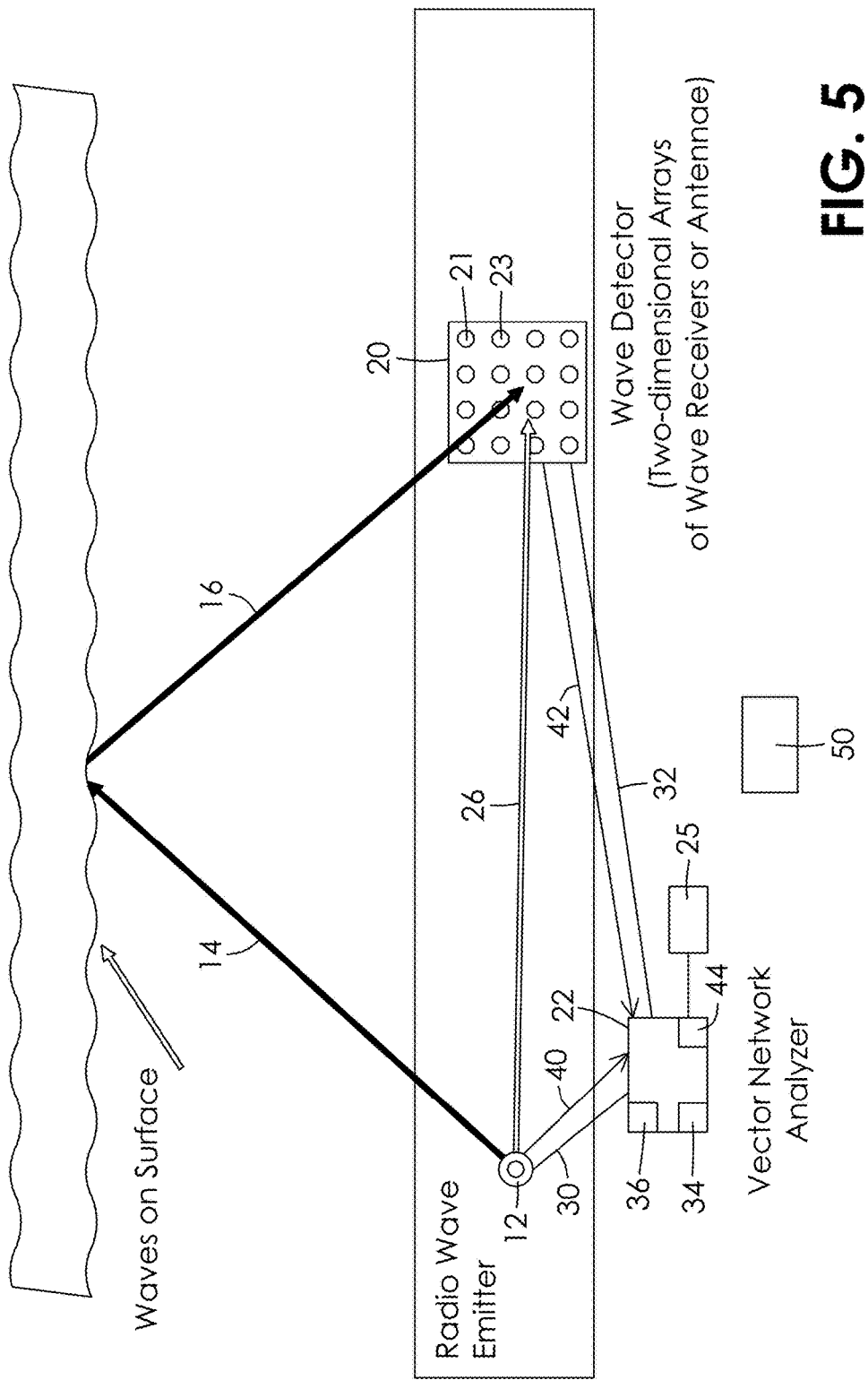
FIG. 5 is another embodiment of the Software Defined Radio Earth Atmosphere Imager of FIG. 1.

In yet another embodiment, shown in FIG. 5, the vector network analyzer 22 is used to measure the amplitude and phase of the sky wave signal 14 and ground wave signal 26 as well as the amplitudes and phases of the carrier wave signal 16 at each receiver or antennae. The wires 30, 32 are not used to provide a connection between the vector network analyzer 22 and each of the radio wave emitter 12 and the detector 20, but rather, radio waves are used. In this embodiment, a first reference radio wave 40 is emitted from the radio wave emitter 12 to the vector network analyzer 22 when a sky wave signal 14 is sent indicating the time that a sky wave signal 14 is sent and a second reference radio wave 42 is sent from the radio wave detector 20 to the vector network analyzer 22 indicating when the carrier wave signal 16 arrives. The vector network analyzer 22 includes a receiver 44. Therefore, this provides a time reference for determining the time taken by the sky wave signal 14 to reach each receiver 21 of the detector 20.

The computing device 50, using imaging software, produces a phase image containing information of the surface waves of an ionization layer. The phase image provides information on the surface waves of an ionization layer such as the surface waves' amplitudes, frequencies and wave vectors.

The complexity of the phase image consisting many waves produced by many wave sources having different amplitudes, frequencies and wave vectors is reduced in its complexity by applying a Fourier transform (or the many other mathematical methods known in science and engineering such as the autocorrelation method) to the phase image, which produces a Fourier image. As shown in FIG. 1, the Fourier image consists of many Fourier peaks (phase intensity peaks) distributed in the Fourier image according to a wave's frequency and wave vector. The amplitude of a Fourier peak represents the power of the waves. The frequency of the Fourier peak represents the energy of the waves. The wave vector of the Fourier peak represents the direction that the waves are traveling.

The carrier wave signals 16 carry information of an ionization layer from which they have reflected. The information carried by carrier wave signals 16 includes information on the surface waves existing on an ionization layer. An ionization layer's surface waves have their own amplitudes and phases. Through the use of the detector 20, a two-dimensional phase image of the waves existing on the object's surface can be revealed enabling a measurement of their amplitudes, frequencies and wave vectors.

Figure 6:
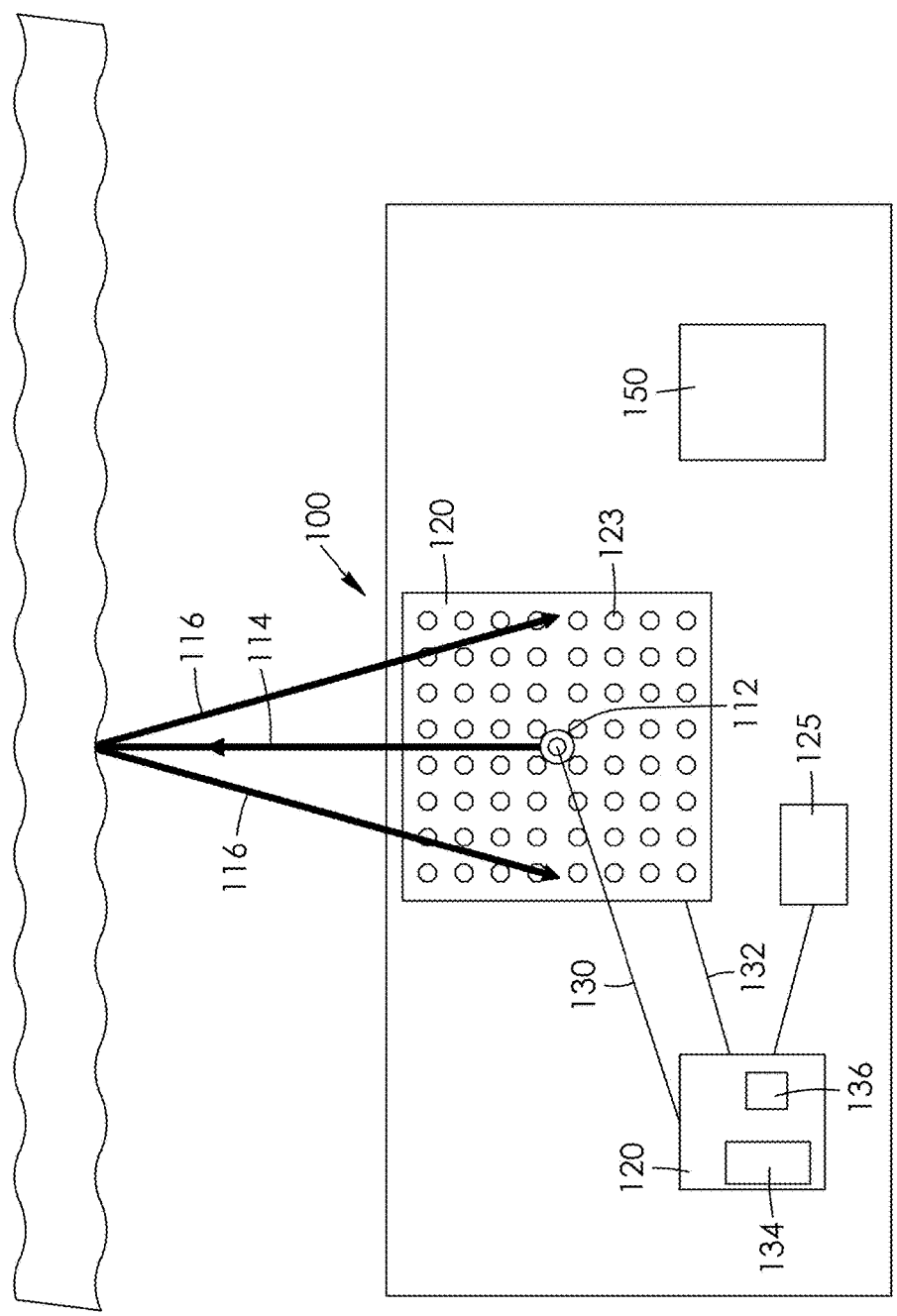
FIG. 6 is an embodiment of an alternative approach to the Software Defined Radio Earth Atmosphere Imager of FIG. 1.

In an alternative approach, shown in FIG. 6, the radio wave emitter 112 is located at the detector 120 in the Software Defined Radio Earth Atmosphere Imager, generally referred to as 100. A radio wave emitter 112, emits sky wave signals 114 that strike an ionization layer or ionosphere. The waves are reflected back to earth as carrier wave signals 116. The carrier wave signals 116 are intercepted by a radio wave detector 120, which is more specifically a two dimensional array detector 120 with either a two dimensional array 123 of radio wave receivers or a two dimensional array of antennae. A vector network analyzer 122 is controlled by a software defined radio 125 (https://en.wikipedia.org/wiki/Software-defined_radioNmedia/File: SDR_et_WF.svg). The SDR 125 obtains data from the vector network analyzer and controls its acquisition and data manipulation. The vector network analyzer is electrically connected to the radio wave emitter 112 and the detector 120 by a first wire 130 between the radio wave emitter 112 and the vector network analyzer 122 and to the detector 120 by a second wire 132 between the detector 120 and the vector network analyzer 122. The vector network analyzer 122 includes a GNSS (Global Positioning System) 134 with synchronizing clocks such as atomic clocks 136 having time resolution of ~10 exp(-11) s. The vector network analyzer 122 is used to measure the amplitude and phase of the sky wave signal 114 as well as the amplitudes and phases of the carrier wave signal 116 at each receiver 121 or antennae.

In one embodiment of the alternative approach, the vector network analyzer 122 is used to measure the amplitude and phase of the sky wave signal 114 as well as the amplitudes and phases of the carrier wave signal 116 at each receiver 121 or antennae. A signal from the radio wave emitter 112 is sent through the first wire 130 and indicates the time that a sky wave signal 114 is sent. A signal from the radio wave detector 120 is sent through the second wire and indicates when the carrier wave signal 116 arrives. Therefore, this provides a time reference for determining the time taken by the sky wave signal 114 to reach each receiver 121 of the detector 120.

Figure 7:
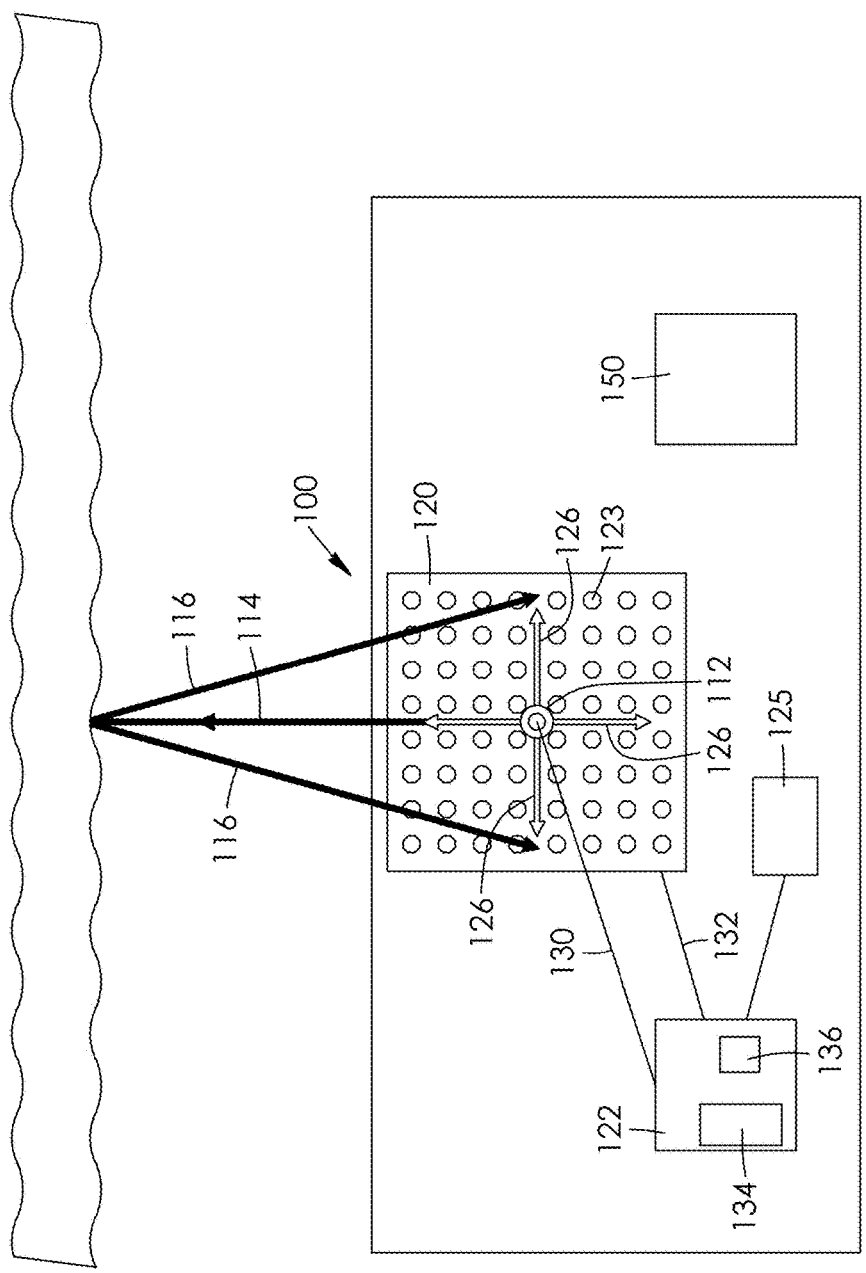
FIG. 7 is an alternative embodiment of the Software Defined Radio Earth Atmosphere Imager of FIG. 6.

In another embodiment of the alternative approach, shown in FIG. 7, the vector network analyzer 122 is used to measure the amplitude and phase of the sky wave signal 114 as well as the amplitudes and phases of the carrier wave signal 116 at each receiver 121 or antennae. The radio wave emitter 112 sends ground wave signals 126 and sky wave signals 114 to the detector 120, rather than using the first wire 130 and second wire 132 to determine the time reference. The ground wave signal 126, which is emitted simultaneously with the radio wave traveling through the sky, i.e., the sky wave signal 114, can be used to determine the time taken from the radio wave emitter 112 to the each receiver 121 of the detector 120. The ground wave signal 126 travels directly to the detector 120 whereas the sky wave signal 114 travels up to an ionization layer and then back down to the detector 120. Knowing the distance traveled by the ground wave signal 126 using GNSS 134 enables the ground wave signal 126 to be used as a time reference for determining the time taken by the sky wave signal 114 to reach each receiver 121 of the detector 120. The difference in time for the carrier wave signal 116 to reach each receiver 121 of the detector 120 is the phase shift or phase difference between each receiver. The phase shift measured by all the receivers 121 can be used by the computer 150 to make a phase image of the waves on the surface of an ionization layer.

Figure 8:
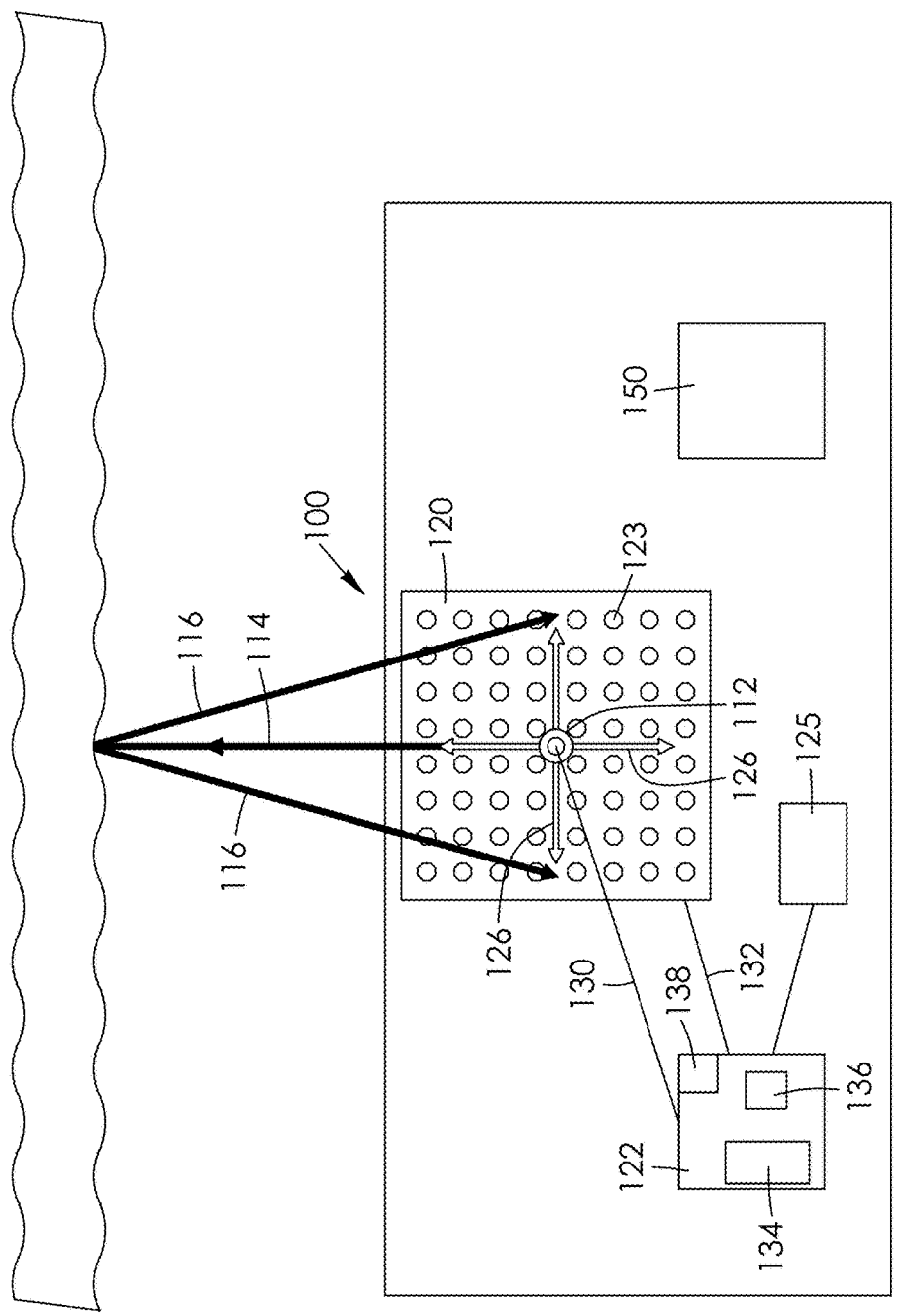
FIG. 8 is another embodiment of the Software Defined Radio Earth Atmosphere Imager of FIG. 7.

In yet another embodiment of the alternative approach, shown in FIG. 8, the vector network analyzer 122 is used to measure the amplitude and phase of the sky wave signal 114 and ground wave signal 126 as well as the amplitudes and phases of the carrier wave signal 116 at each receiver or antennae. The vector network analyzer 122 includes a quadrature processor 138, which measures the angular rotation of the carrier wave signal 116 and sky wave signal 114. The difference in rotation is a measure of the phase shift. Again, the phase shift measured by all the receivers 121 can be used by the computer 150 to make a phase image of the waves on the surface of an ionization layer. The phase shift information is sent to a computing device 150 in electronic communication with the vector network analyzer 122. The computing device 150 records and analyzes the data to produce a phase image made from all of the measurements of the receivers 121 of the detector 120. The phase image contains information of the surface waves of an ionization layer.

Figure 9:
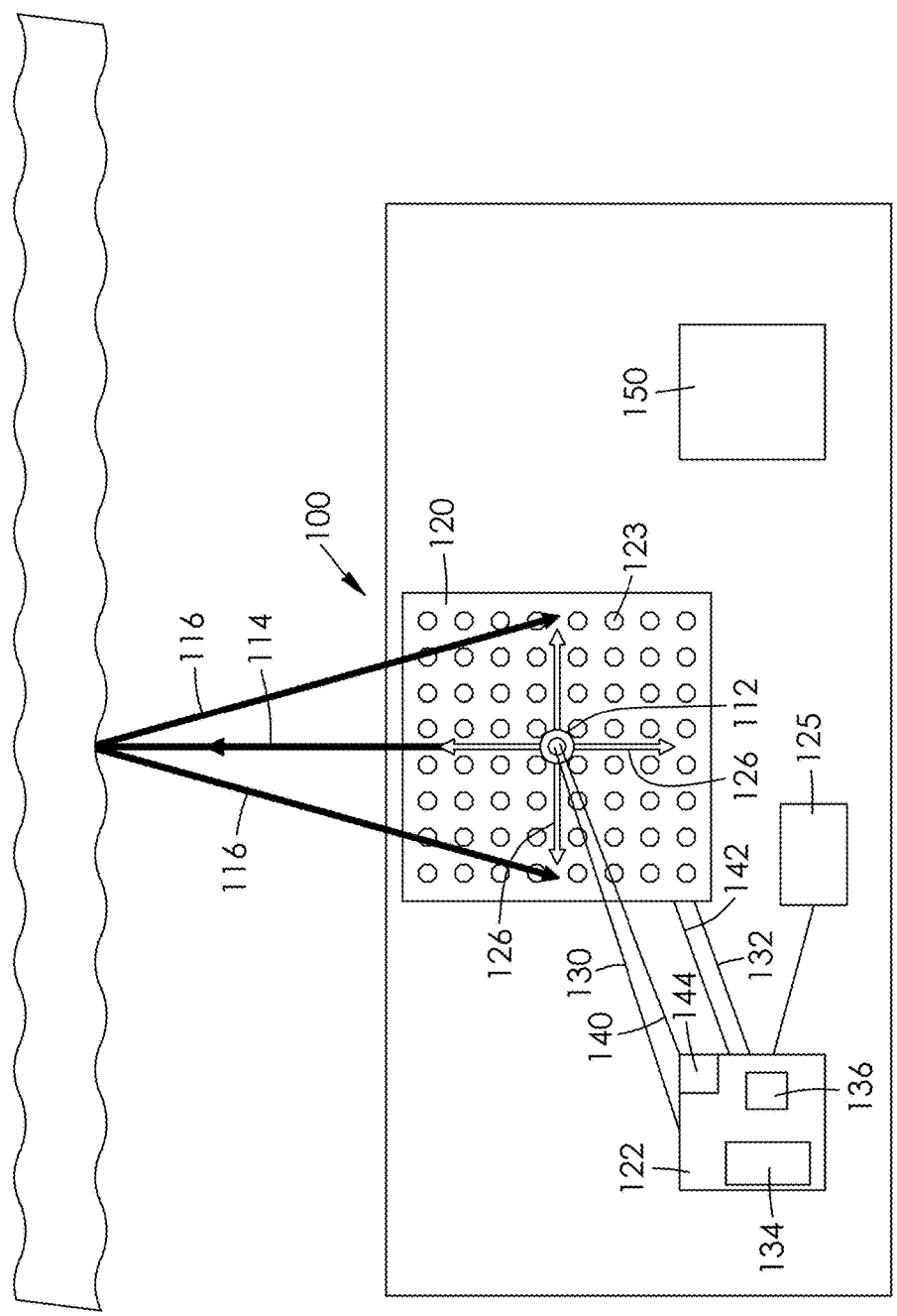
FIG. 9 is another embodiment of the Software Defined Radio Earth Atmosphere Imager of FIG. 7.

In yet another embodiment of the alternative approach, shown in FIG. 9, the vector network analyzer 122 is used to measure the amplitude and phase of the sky wave signal 114 and ground wave signal 126 as well as the amplitudes and phases of the carrier wave signal 116 at each receiver or antennae. The wires 130, 132 are not used to provide a connection between the vector network analyzer 122 and each of the radio wave emitter 112 and the detector 120, but rather, radio waves are used. In this embodiment, a first reference radio wave 140 is emitted from the radio wave emitter 112 to the vector network analyzer 122 when a sky wave signal 114 is sent indicating the time that a sky wave signal 114 is sent and a second reference radio wave 142 is sent from the radio wave detector 120 indicating when the carrier wave signal 116 arrives. The vector network analyzer 122 includes a radio receiver 144. Therefore, this provides a time reference for determining the time taken by the sky wave signal 114 to reach each receiver 121 of the detector 120.

The computing device 150 using imaging software, of which there are many, produces a phase image containing information of the surface waves of an ionization layer. The phase image provides information on the surface waves of an ionization layer such as the surface waves' amplitudes, frequencies and wave vectors.

As described above in reference to FIG. 1, the complexity of the phase image consisting many waves produced by many wave sources having different amplitudes, frequencies and wave vectors is reduced in its complexity by applying a Fourier transform (or the many other mathematical methods known in science and engineering such as the autocorrelation method) to the phase image, which produces a Fourier image.

In an alternative embodiment, a one-dimensional array of radio wave receivers or a one dimensional array of radio wave antennae are used in a one dimensional array detector.

Figure 10:
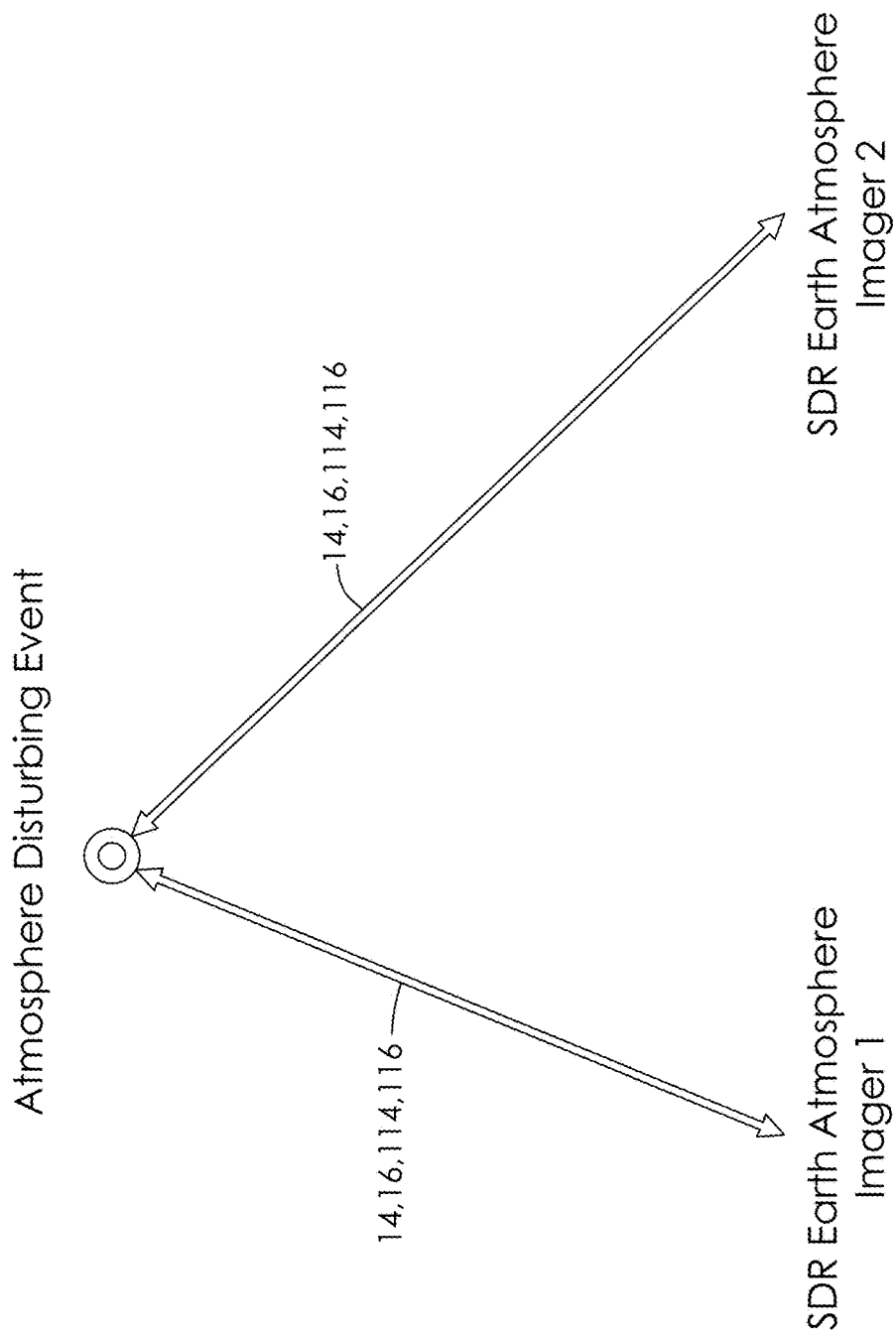
FIG. 10 shows two wave vectors produced by two SDR Earth Atmosphere Imagers used to determine the location of an Earth atmosphere disturbing event by triangulation.

As shown in FIG. 10, two SDR earth atmosphere imagers 10, send and receive radio wave signals 14, 16, 114, 116 that provide information about an atmosphere disturbing event. Using two SRD Earth Atmosphere Imagers placed at two separated locations can determine the precise location of an atmosphere disturbing event from the two wave vectors of the same surface wave (the wave created in the ionosphere by the disturbance) reaching the two SRD Earth Atmosphere Imagers by using triangulation of the wave vectors. Likewise, a third placement of a SRD Earth Atmosphere Imager provides more precision of the location of the atmosphere disturbing event as well as any atmosphere disturbing event that could exist between the first two SRD Earth Atmosphere Imagers. Since most of the waves on the surface of an ionization are due to meteorological disturbing events, placement of SDR-Earth Atmosphere Imagers at numerous locations could be used to help monitor the Earth's atmosphere over large regions and possibly globally.

The radio wave emitter emits sky wave signals 14, 114 that are reflected back as carrier wave signals 16, 116. The vector network analyzer 22, 122 measures the phase of the emitted sky wave signal 14, 114 as well as the phase of the carrier wave signal 16, 116 detected at each receiver 21, 23 of the detector 20, 120. The differences in phase of the carrier wave signal 16, 116 relative to the phase of the sky wave signal 14, 114 reaching each receiver 21, 23 of the detector 20, 120, i.e., the phase shift or phase difference between each receiver 21, 23, is used to make a phase image 210, as shown in FIG. 1. The phase image 210 is then mathematically analyzed using a Fourier Transform 212 (and by many other mathematical methods known in science and engineering) to obtain properties of these surface waves. From the square of the amplitude of the waves on the surface on an ionization layer, the power of this wave can be determined. From the phase of the waves existing on the surface on an ionization layer, the frequencies and wave vectors of the waves existing on the surface of an ionization layer can be determined.

The time taken for a sky wave signal 14, 114 traveling straight up 100 km through the Earth's atmosphere to an ionization layer and then reflected straight back down as a carrier wave signal 16, 116 to a receiver 21, 23 is ~6.67×10 exp (−4) s. The time measurement resolution of the SDR Earth Atmosphere Imager 10 using GNSS Timers is ~10 exp (−11) s. Using this capability, there is excellent time resolution for measuring the phase difference or phase shift of the sky wave reaching each receiver 21, 121 of the detector 20, 120 to produce a high resolution phase image. The high resolution phase enables the waves existing on the surface of the Earth's ionization layers, which appear to have frequencies ranging from ~2 Hz to ~10 Hz, as observed in the ionosonde data (https://www.ngdc.noaa.gov/stp/iono/ionogram.html) to be seen in the phase image. The SDR Earth Atmosphere Imager 10 will enable these waves to be seen over a much larger frequency range than possible with current technology.

Although the SRD Earth Atmosphere Imager measures locally, the waves on the surface of an ionization layer can come from far distances regionally and globally providing information of the atmosphere influencing events occurring away from the local measurement. Numerous SRD Earth Atmosphere Imagers placed at many locations around the world enables the global measurement of Earth atmosphere disturbing events.

Figure 11:
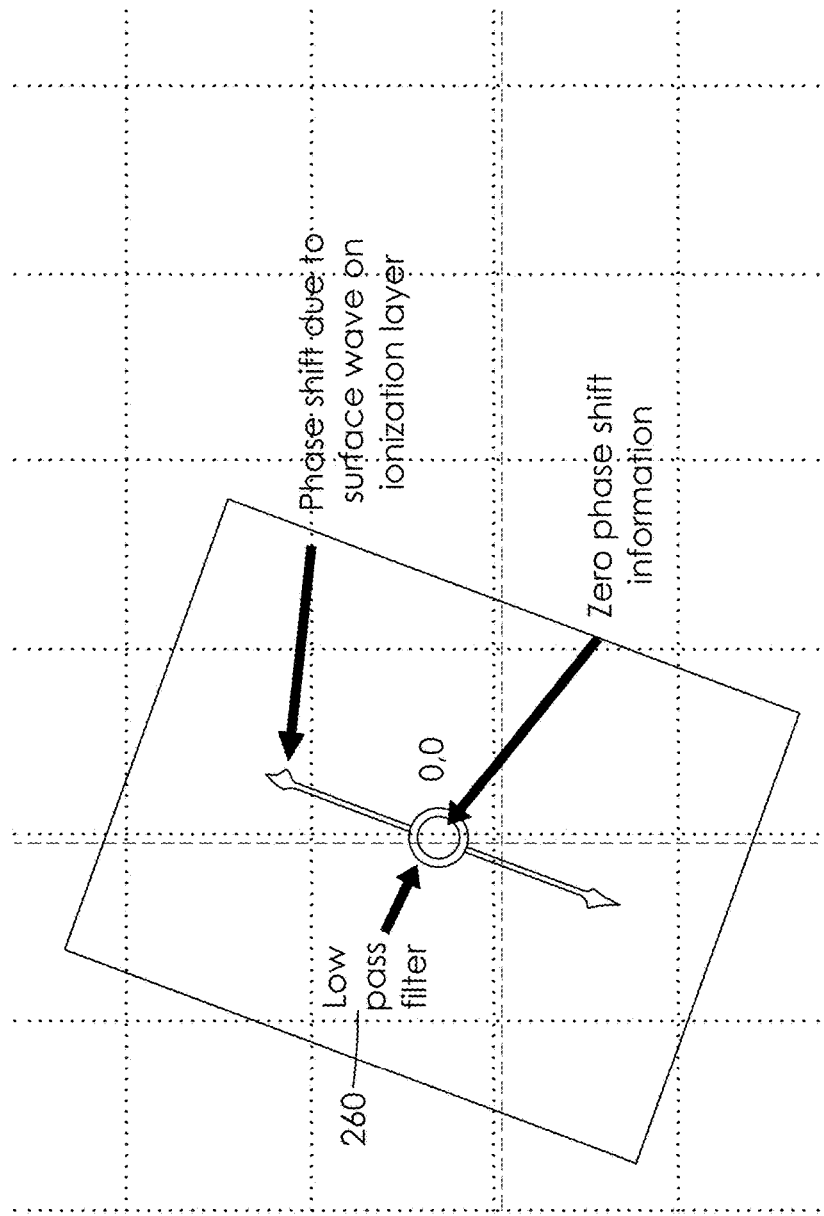
FIG. 11 shows the use of a low pass filter applied to the Fourier image for acquiring the zero phase shift information used to determine the Earth atmosphere's refractive index.

As shown in FIG. 11, a low pass filter 260 allows the intensity or amplitude of the zero phase shift information to be used to monitor the Earth's atmosphere's refractive indices. The low pass filter removes the amplitudes and phases due to the waves on the surface of the Earth's ionization layers. Physically, the low phase filter is an aperture that allows only the phase information around the 0,0 frequency point within the Fourier image to be used for analysis purposes. Mathematically, all intensities are removed except the amplitude information around the 0,0 point in the phase image using a Hamming window or one of the many other types of image filters. Removal of an ionization layer's surface wave information by the low pass filter leaves only the information that hasn't been phase shifted by the waves on an ionization layer. The low pass filtered information (zero phase shift information) can then be used to monitor the changes in the Earth atmosphere's refractive indices that depend on the Earth Atmosphere's temperature, pressure and composition.

Example 1

Figure 12:
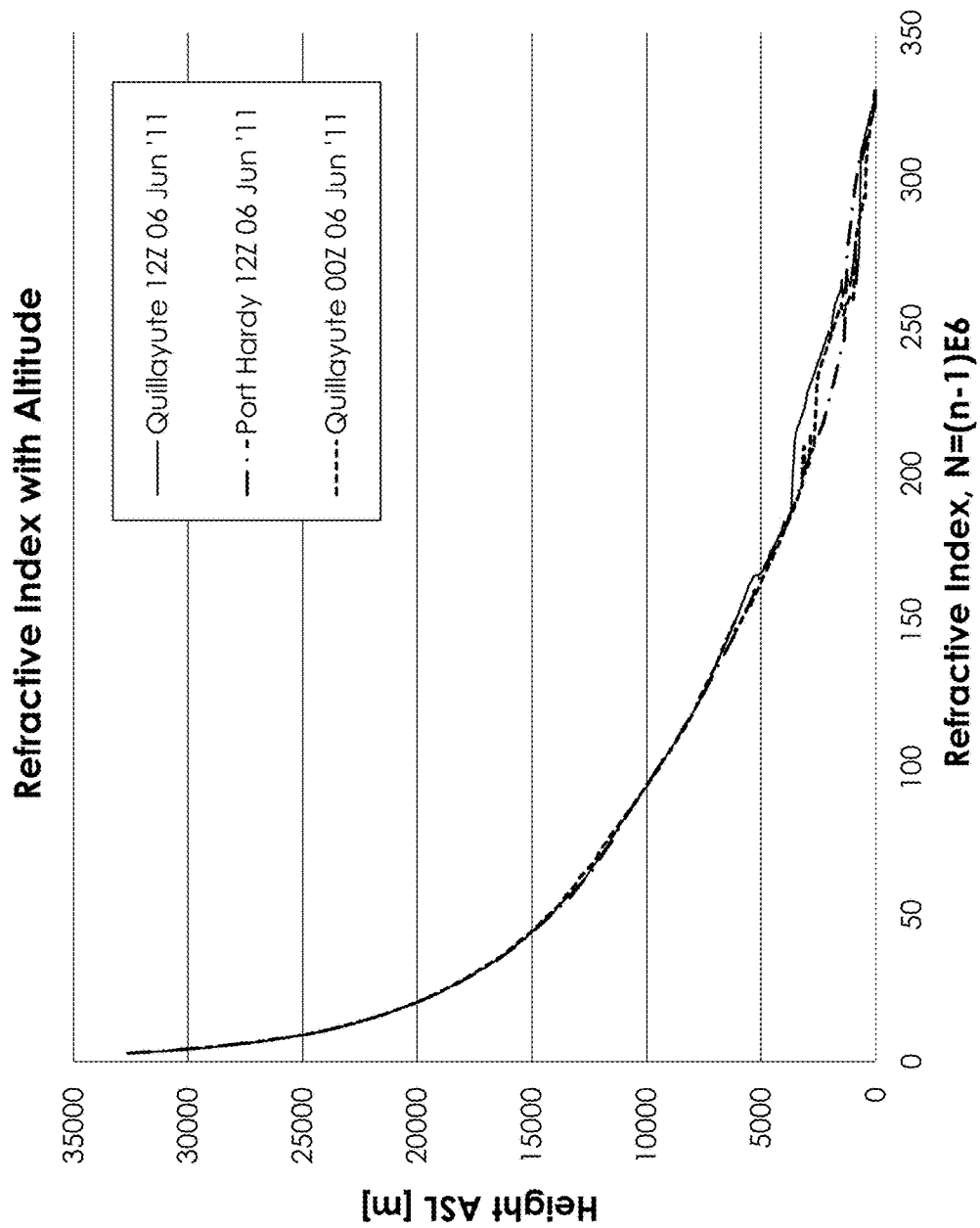
FIG. 12 is a graph showing the refractive index of earth's atmosphere over Port Hardy and Quillayute on Jun. 6, 2011 measured by a weather balloon.

As shown in FIG. 12, a prior art determination of the Earth atmosphere's refractive index shows that it varies exponentially decreasing in value from the surface of the Earth up to high altitudes, greater than 30,000 m. The exponentially varying refractive indices from the ground to ~35,000 meters have been and are still being measured daily using atmospheric balloons providing one measurement at one location at one altitude at one time. From the balloon data, the refractive indices of the upper layer of the Earth's atmosphere, i.e., from about 12,000 m to about 35,000 m, are relatively stable remaining constant for long periods of time. The refractive indices of the lower layer of the Earth atmosphere, i.e., from 0 m to ~12,000 m, are unstable varying with time due to the constantly changing Earth atmosphere disturbing events such as the changing weather affecting the atmosphere's temperatures, pressures and compositions.

To determine the change in refractive indices in the lower layer of the Earth atmosphere, the boundary conditions above and below this layer need to be known. The boundary condition existing at the top of the lower Earth atmosphere (around 12,000 m altitude) is determined from the atmospheric balloon data. The boundary condition existing at the bottom of the lower Earth atmosphere is easily measured from the surface of the Earth.

The SDR Earth Atmosphere Imager can use this balloon data to solve some of the constants in the mathematical equation 4, making it possible using radio waves to continuously measure and thus monitor the changes in the lower atmosphere due to weather and other atmosphere disturbing events (e.g., a city's air pollution or smoke from forest fires). The SDR Earth Atmosphere imager offers another means by measuring the exponential dependence of the refractive index on altitude using Equation 4 shown in FIG. 13 making it possible to measure "continuously" the small changes in the refractive index due to weather and atmosphere disturbing events, which is not possible to measure continuously by balloons. Hence both the refractive index as a function of altitude and signals measuring surface waves on an ionization layer can be measured using SRD. Using SRD, the phase image of the surface waves provides a measurement of the amplitude, frequency and wave vector of the surface waves. Once a phase image is made its analysis by a Fourier transform also provides information about the radio waves that weren't affected or phase shifted by the surface waves. These unaffected radio waves, which can be obtained by using a low pass filter to the Fourier image, FIG. 11, can be used to determine the Earth atmosphere's refractive index. All of the antennae of the detector contribute to producing the low pass filtered phase information. The phase information that passes through the aperture or low pass filter hasn't been shifted very much when reflecting off an ionization layer so this information remains close to the center of the Fourier image, I.e., the 0,0 point, however, it has been phase shifted a little bit providing the needed information of the atmosphere's refractive index and its changes. The waves on the surface of an ionization layer, which have a strong interaction with the radio waves, have their phase shifts outside of the low pass filter so don't get transmitted and are removed from the analysis of the phase information around the 0,0 point.

The refractive index varies exponentially on altitude, thus can be solved mathematically resulting in equation 4.

From FIG. 12 (refractive index as a function of altitude), the refractive index varies from ~1.00015 at high altitude to ~1.00033 at low altitude or ground level. The fluctuations in refractive index at low altitude vary on the order of ±0.00001 with some of the bigger fluctuations being as large as 0.00005. These fluctuations represent changes in the atmosphere's temperature, pressure and composition. The ability to measure these small fluctuations in refractive index depends on our ability to measure the refractive index or the resolution of the refractive index measurement, Δn, given by $$\Delta n = (c/h)\Delta t$$

where c is the speed of light, h is the distance traveled and Δt is the precision in time measured using the GNSS timers (10 exp(-11) s). For h=200,000 meters (100,000 m up to the surface of an ionization layer and 100,000 m back down to the surface of the Earth), the speed of light c=3×10 exp(8) m/s and Δt=10 exp(-11) seconds, the resolution in measuring the changes in refractive index is 1.5×10 exp(-8) or 0.000000015, which enables measurement of small fluctuations in the refractive index.

Figure 13:
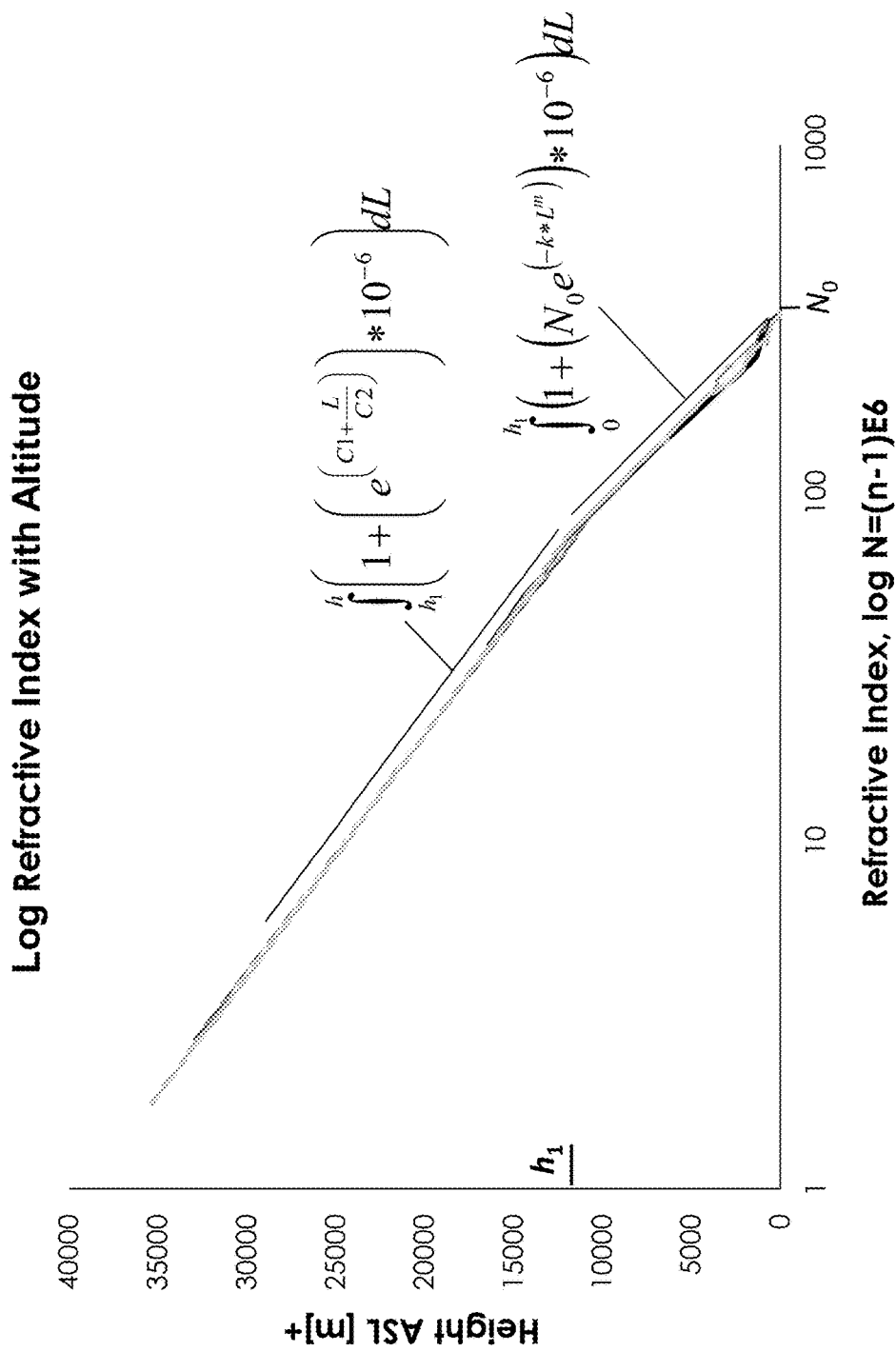
FIG. 13 is a Log plot of FIG. 20 showing application of the two exponentials in equation 4.

In the present technology, the phase shift or change in refractive index in the lower Earth atmosphere can be determined from the travel time, Δt of a radio wave traveling from Earth's surface to an ionization layer (the sky wave) and reflected back again to the surface of the Earth (the carrier wave). Its mathematical expressions are given by the following three equations.

$$\Delta t = \frac{x}{c} \quad (2)$$

$$\Delta t = \frac{\int n(L)dL}{c} \quad (3)$$

$$\Delta t = \frac{\int_{h_1}^{h} \left(1 + \left(e^{\left(C1+\frac{L}{C2}\right)}\right)*10^{-6}\right)dL + \int_{0}^{h_1} \left(1 + \left(N_0 e^{(-k*L^m)}\right)*10^{-6}\right)dL}{c} \quad (4)$$

where,
Δt is the travel time of the radio wave
x is the optical path length
c is the speed of light
n is the refractive index
n(L) is the refractive index as a function of distance traveled or altitude height
L is the distance traveled
h is the altitude of the ionization layer
$h_1$ is the altitude where the refractive index in the upper atmosphere is relatively constant (~12,000 m)
C1 and C2 are constants which represent the curve of the exponentially varying refractive index determined from the atmosphere balloon data
$N_0$ is the index of refraction at the surface of the Earth
k and m are constants determined from SRD Earth Atmosphere measurements Using the above three equations, the index of refraction n(L) can be determined for any value up to $h_1$ from the ground enabling continuous monitoring of changes in the Earth's atmosphere, i.e., due to changes in weather and other atmosphere disturbing events. Application of Equation 4 to the exponentially varying refractive index, which can be linearized when plotted using natural log of the refractive index is shown in FIG. 13. Graphically in FIG. 13, a change in slope of the line from 0 to $h_1$ represents a change in the Earth's atmosphere's refractive index.

Example 2

An atmosphere disturbing event, such as, but not limited to weather, forest fires, volcanoes, and earthquakes is detected by emitting a radio wave from an emitter to the ionosphere, detecting a carrier wave reflected from the ionosphere with a one or two dimensional array of radio wave receivers housed in a radio wave detector, determining a phase difference between the emitted radio wave and the carrier wave with a vector network analyzer that includes synchronized timers, and analyzing the results. A phase image containing the image of the waves due to the atmosphere disturbing event is produced by either the quadrature method or time method using the vector network analyzer and SDR. The location of the atmosphere disturbing event can be determined using at least two SDR Earth Atmosphere Imagers provided with GNSS in geographically different locations and triangulating. The power of the disturbance can be calculated from the amplitude of the waves in the phase image. The energy of the disturbance can be calculated from the frequency of the waves in the phase image. The direction of movement of the waves can be determined from the wave vector of the waves in the phase image. The location of the disturbance can be determined from two or more wave vectors of the phase images taken by two or more SDR Earth Atmosphere Imagers located at difference places.

Example 3

Light reaching Earth from stars and reflective objects in space suffer from imaging aberrations often appearing as "twinkling" of the light. The SDR Earth Atmosphere Imager can be used to help correct the aberrations adversely affecting the imaging of stars. Knowing the movement of the ionosphere by measuring its surface waves will help correct the light from the stars and reflective objects in space as well as the light from the guide stars currently being used to help correct imaging aberrations due to the Earth's atmosphere and ionosphere.

Example 4

Impacts of the technology:
Monitor climate change
Predict daily weather
Monitor atmosphere for forest fires and lightening strikes
Monitor earthquakes and plate tectonics (alert warnings)
Monitor tsunamis (alert warnings)
Monitor air conditions (city and industrial pollution)
Monitor intensity and movement of large storms (weather, climate change)
Monitor jet streams (wind power, climate change)
Monitor solar weather/aurora borealis (scientific studies)

Example 5

An updated description of a multiplexed Software Defined Radio (SDR) Earth Imaging device is provided in this example. The device has confirmed to be able to image Earth disturbances using reflected radio waves from Earth's ionization layers by measuring the time and phase of the radio waves received at its antenna array acting as a radio wave camera. See FIGS. 14a, b and c. Each antenna is a pixel in the image. This unique device exists only at the University of Victoria (UVic) and Dominion Radio Astrophysical Observatory (DRAO), Penticton, BC. It enables the Earth to be imaged in new ways providing new information previously unobtained. This device has two modes of operation. One mode is SDR Earth Imager and the other mode is SDR Earth Atmosphere Imager. Both modes create images using radio waves transmitted from Earth's surface upwards through the atmosphere and then reflected back down to Earth's surface by reflecting off Earth's ionization layers. At the Earth's surface, they are captured by the SDR Earth Imaging device's antennae. Measurement of the radio wave received at each antennae enables two methods of imaging, one based on time, the other based on phase. The arrival time and phase at each antennae differ due to waves existing on the surface of Earth's ionization layers. 80% of these waves are created by Earth disturbing events such as, but not limited to solar heating and cooling, big weather systems, earthquakes, lightning strikes, and forest fires and 20% are created by solar events such as the sun's solar flares, solar wind, pulsars, etc. The waves contain important information of the Earth disturbing events such as their power, energy and location of occurrence. Other valuable information that can be obtained includes Earth's atmosphere's three-dimensional temperature, pressure and compositions (water and aerosols) as well as the 3D composition of clouds as described in this report that will help understand, monitor and prepare for climate change.

Prototypes of the SDR Imaging device were constructed and tested. As shown in FIGS. 14a, b and c, the device produced images of the waves existing in Earth's F ionization layers. Its high quality data clearly revealed the presence of moving waves, a first by any research group. The frequencies used to image Earth's ionization layers are 3-4 MHz, 7 MHz and 10 MHz frequencies or about 1 MHz to about 20 MHz. These frequencies are low enough to reflect off Earth's ionization layers and do not require a license for transmission. The radio wave frequency defines the type of antennas needed, has a bearing on spatial resolution, and defines the equipment required.

Earth's ionization layers have two superlative qualities. They are the most sensitive Earth entity being lighter than air. They are also Earth's largest sensor to disturbances whether from space or from Earth itself. The waves existing on their surface have been known for ~100 years monitored in ionosondes, produced by one transmitter and one antenna equivalent to having one pixel in an image insufficient to determine the properties of the ionization layer's waves. Earth has four ionization layers, D, E, F1 and F2 produced by the sun's radiation varying in height from ~25 km to ~400 km. In the evening, the D and E layers vanish and the F1 and F2 layers merge to continue the F layer's existence throughout the night enabling the Earth to be monitored at all times. The ionization layer's waves have been monitored for communication purposes and are believed to cause decoherence of propagating radio wave signals producing noise that limits the information transferred. Understanding and knowing the waves' patterns can be used to reduce the noise in radio wave communications enabling more and higher quality information to be transferred.

One set of waves (FIGS. 14a, b and c) had constant amplitude and frequency and possibly represents Earth's breathing due to temperature and pressure gradients caused by solar heating and cooling of Earth enabling a measure of the heat and mass transfer occurring in all lateral and longitudinal directions important information for climatologists. Another type of wave was sporadic and had a large amplitude spike (FIGS. 15a, b and c) possibly representative of lightning, a type of Earth disturbing event that is short and powerful. Similar waves by pre-earthquake signatures will have a more complex spike representing the fault's material, size and defect structures occurring one to five days before big earthquakes occur. Ionosondes that produce one pixel in an image see the pre-earthquake signatures but cannot adequately determine their properties nor determine their location. The SDR Imaging device determines the location of the pre-earthquakes signature using triangulation from two locations, hundreds of miles apart possibly providing warnings of days before a big earthquake, whereas the current method (laser interferometry) provides just 30 seconds.

There are a couple of new technologies making this possible. First is software defined radio (SDR) that enables the time and phase of the transmitted and received radio wave at each antennae to be measured. The second is multiplexers enabling the measurement of the arrival time and phase shift of the radio wave at all of the antennae at the same time. The time and phase measurements are then transferred to a computer to form the image. The difference in arrival time uses the SDR (software) and the difference in received radio wave phase uses hardware, the quadrature. They provide two means to produce the images of the Earth's ionization layer's waves, which are equivalent. Collectively, the time and phase measurements by each antenna form a time image or phase image that is analyzable using a Fourier transform or correlation function that are standard engineering methods of image analysis. The information collected will ultimately enable the transfer function of the Earth disturbing events to be determined important for simulation studies. The difference in arrival time and phase difference between each antennae within the image is caused by the radio waves traveling different distances when reflected off the peaks and valleys of the waves on the surface of Earth's ionization layers. The amplitude of the waves are 100s of meters which is sufficiently large to be measured by the SDR Earth Imager. Other radio wave measurements based on Doppler shifts have poor sensitivity only able to measure disturbances >7R which is too insensitive to be useful. The waves on the surface of the Earth's ionization layers have many amplitudes, frequencies and travel directions (wave vectors) providing valuable information about the earth disturbing event that created the wave. The amplitude $(d(x)cA_o)$ squared measures the Earth disturbing event's power where $A_o$ is the amplitude of the Earth disturbing event, $c<1$ is its coupling to the ionization layer and $d(x)$ is its damping as a function of distance, x, along the ionization layer. The phase $(-2\pi if/k)$ consists of the measured frequency that is the same as the Earth disturbing event's frequency enabling the Earth disturbing event's energy to be determined and the wave's wavevector is unknown, which can be determined using two SDR Earth Devices, one at University of Victoria and the other at DRAO by stereographic projection. Using three SDR Earth Devices, one is able to determine all angles and locations i.e., the precise location of the Earth disturbance. A Fourier transform of the phase image separates all the Earth ionization layer's waves of different amplitudes and frequencies using their wavevectors and frequencies in Fourier space. The information collected enables a wealth of Earth (and space) information to be obtained. There are attempts to characterize Earth's ionization layers using multiple satellites, however being spread out and looking at Earth from different altitudes and positions loses the coherence of the wave information. Only noise is measured, which is being treated statistically. Similarly, for the measurements of multiple ionosondes located in different countries produces only noise, which is being treated statistically. It is difficult (possibly impossible) to measure the properties of the ionization layer's waves by these methods as there are too many unknowns for the limited number of measurements. A local, low-power configuration having a large antennae array is required for retaining the coherence of the radio signals. The SDR Imaging device enables this imaging configuration to be realized that is unique in the world.

The second mode of operation of the SDR Earth Imaging device does not use the waves on the surface of the ionization layer. Instead, a low pass filter is used to remove the signals associated with the ionization layer's waves providing a signal representative of a flat surface on the Earth's ionization layers. This flat surface signal is used to measure the refractive index of the Earth's atmosphere, which decreases exponentially, very slowly from the Earth's surface up to the ionization layers. The exponential dependency is made linear using a Fourier transform resulting in a transfer function of the Earth's atmosphere's refractive index as a function of altitude. All boundary conditions and constants associated with this transfer function are determinable using refractive index measurements on the surface of the Earth and balloon data that is taken once per day at many locations. The Earth has four ionization layers that reflect the radio waves at different frequencies providing four equations to solve four unknowns of the atmosphere such as its pressure, temperature and compositions (water and aerosol contents). A higher pressure, lower temperature, larger composition(s) increases the velocity of the radio wave measured by its arrival time and phase shift at the antennae, i.e., the change in the atmosphere's refractive index. Additionally, Earth's four ionization layers reflect the radio waves at different points or altitudes providing four different viewpoints enabling 3D imaging/measurements of Earth's temperature, pressure and compositions by tomography's angular/rotational methods. Additionally, since the Earth's atmosphere is not stationary and is composed of shifting clouds that consist of granulated ice (hail), water droplets and snowflakes of many forms, this device could measure their sizes, shapes and concentrations using 3D confocal scanning as a function of altitude, i.e., as the clouds float by, this device will scan the clouds from their lowest altitude to their highest altitude enabling determination of the densities of the granulated ice, water droplets and snowflakes by measuring the change in amplitude and velocity of the radio wave passing through the cloud. A high density of particles scatters the radio wave more than a low density affecting the radio wave's amplitude. Each particle has its own scattering signature. Hail scatters the radio wave more than water droplets and snow, being thin and flat, scatters the radio wave more preferentially by reflection and diffraction. The SDR Imaging device enables these measurements to be made providing new information not be obtained by other means such as lidar where its wavelength (visible light) is too short making clouds opaque especially dense ones. Radio waves are phase shifted by passing through clouds measurable by the SDR Earth Atmosphere mode of operation. This much needed data is required for Canada's Earth Atmosphere's modelers who are still grappling with simulating the reflectance of radiation by clouds, as well as, aerosols. This SDR Earth Imaging device will help simulators predict climate change possibly enabling Canadians to better prepare for its changes.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. For example, software having the capabilities of the software-defined radio of the present technology may be used in alternative embodiments. Those skilled in the art will recognize or be able to ascertain using no more than routine experimentation, many equivalents to the specific example embodiments specifically described herein. Such equivalents are intended to be encompassed in the scope of the claims, if appended hereto or subsequently filed.

What is claimed is:

1. A Software-Defined Radio (SDR) Earth Atmosphere Imaging system for use with a computing device, the system comprising at least one imager, the imager comprising: a radio wave emitter; a radio wave detector, the radio wave detector including either a one dimensional array of radio wave receivers or a two-dimensional array of radio wave receivers; a vector network analyzer, the vector network analyzer including a Global Navigation Satellite System (GNSS) and an at least one timer; and a software defined radio in electronic communication with the vector network analyzer, wherein the radio wave emitter is for emitting a sky wave to the ionosphere upon sending a first time signal to the vector network analyzer, the radio wave detector is for emitting a second time signal to the vector network analyzer upon receiving the carrier wave; and the software defined radio is for controlling the vector network analyzer.

2. The system of claim 1, wherein the radio wave detector is a two-dimensional array of radio wave receivers.

3. The system of claim 2, wherein the vector network analyzer includes a quadrature processor.

4. The system of claim 3, wherein the imager includes a low pass filter.

5. The system of claim 4, comprising a plurality of imagers.

6. The system of claim 5, further comprising a computing device, the computing device in electronic communication with each vector network analyzer of the imagers.

7. The system of claim 6, wherein the computing device includes a memory and a processor, the memory including instructions for calculating a phase shift.

8. The system of claim 7, wherein the memory further includes instructions for calculating a refractive index based on the phase shift.

9. The system of claim 8, wherein the radio wave emitter is configured to emit a ground wave and the radio wave detector is configured to detect the ground wave.

10. A method of detecting an atmosphere disturbing event at a location, the method comprising utilizing a least one imager, the imager comprising: a radio wave emitter; a radio wave detector, the radio wave detector including either a one dimensional array of radio wave receivers or a two dimensional array of radio wave receivers; a vector network analyzer, the vector network analyzer including a GNSS and an at least one timer, the vector network analyzer in electronic communication with each of the radio wave emitter and the radio wave receiver, a software defined radio, which is in electronic communication with the vector network analyzer; and a computing device in electronic communication with the vector network analyzer; the method comprising the radio emitter emitting a radio wave to the ionosphere and concomitantly sending a first time signal to the vector network analyzer, the radio wave detector detecting a carrier wave reflected from the ionosphere and concomitantly sending a second time signal to the vector network analyzer, determining a time difference between the first time signal and the second time signal, and determining a phase difference between the emitted radio wave and the carrier wave, based on the time difference.

11. The method of claim 10, further comprising locating the atmosphere disturbing event using triangulation between at least two imagers.

12. The method of claim 11, further comprising analyzing a phase shift to quantify the atmosphere disturbing event.

13. The method of claim 12, further comprising reporting on the location of the atmosphere disturbing event.

14. A Software Defined Radio (SDR) Earth Atmosphere Imaging system, the system comprising an at least one imager, the imager comprising: a radio wave emitter configured to emit a sky wave, a ground wave and a first time signal; a radio wave detector, the radio wave detector including a two dimensional array of radio wave receivers, the radio wave detector for receiving a carrier wave and the ground wave and transmitting a second time signal; a vector network analyzer including a GNSS and at least one synchronization clock, the vector network analyzer in electrical communication with the radio emitter via a first wire and with the radio wave detector via a second wire, the wires for transmitting the time signals; a software defined radio in electronic communication with the vector network analyzer; and a computing device, the computing device in electronic communication with the vector network analyzer.

15. The system of claim 14, comprising two or more imagers.

16. The system of claim 15, wherein the vector network analyzer further includes a quadrature processor.

17. A Software Defined Radio (SDR) Earth Atmosphere Imaging system for use with a computing device, the system comprising an at least one imager, the imager comprising: a radio wave emitter for emitting a sky wave and a first time signal; a radio wave detector, the radio wave detector including either a one dimensional array of radio wave receivers or a two dimensional array of radio wave receivers, the radio wave detector for receiving a carrier wave and sending a second time signal; a vector network analyzer, the vector network analyzer including a GNSS and a quadrature processor, the vector network analyzer in electrical communication with the radio wave emitter via a first wire and the radio wave detector via a second wire, the wires for transmitting the time signals; and a software defined radio in electronic communication with the vector network analyzer.

18. A method of detecting an atmosphere disturbing event at a location, the method comprising utilizing the imaging system of claim 17.

\* \* \* \* \*